US010783682B2

(12) United States Patent
Dotterweich et al.

(10) Patent No.: US 10,783,682 B2
(45) Date of Patent: Sep. 22, 2020

(54) DISPLAYING ITEMS OF INTEREST IN AN AUGMENTED REALITY ENVIRONMENT

(71) Applicant: United Parcel Service of America, Inc., Atlanta, GA (US)

(72) Inventors: Andrew Dotterweich, Milton, GA (US); Christopher T. Schenken, Alpharetta, GA (US); Jeffrey Cooper, Marietta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 15/798,664

(22) Filed: Oct. 31, 2017

(65) Prior Publication Data
US 2018/0122119 A1    May 3, 2018

Related U.S. Application Data

(60) Provisional application No. 62/416,248, filed on Nov. 2, 2016.

(51) Int. Cl.
| G06T 11/60 | (2006.01) |
| G06K 7/10 | (2006.01) |
| G06Q 10/08 | (2012.01) |
| G06F 3/0482 | (2013.01) |
| G06K 7/14 | (2006.01) |

(52) U.S. Cl.
CPC ............ *G06T 11/60* (2013.01); *G06F 3/0482* (2013.01); *G06K 7/10297* (2013.01); *G06K 7/1413* (2013.01); *G06K 7/1417* (2013.01); *G06Q 10/0838* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| 7,624,024 B2 | 11/2009 | Levis et al. |
| 9,632,313 B1 | 4/2017 | Madan et al. |
| 9,645,482 B2 | 5/2017 | Joseph |
| 9,697,548 B1 * | 7/2017 | Jaff ................... G06Q 30/0601 |
| 10,535,169 B2 | 1/2020 | Dotterweich et al. |

(Continued)

OTHER PUBLICATIONS

Non-Final Office Action received for U.S. Appl. No. 15/798,551, dated Nov. 1, 2018, 15 Pages.

(Continued)

*Primary Examiner* — Todd Buttram
(74) *Attorney, Agent, or Firm* — Shook, Hardy and Bacon, L.L.P.

(57) ABSTRACT

Computer program products, methods, systems, apparatus, and computing entities are provided for overcoming the technical problem of providing an augmented reality that displays an actual image of the item or a proportionally dimensioned representation of the item to a user. To overcome this challenge, two separate approaches can be used: a beacon/tag/sensor-based approach and a marker-based approach.

18 Claims, 17 Drawing Sheets

(56) References Cited

U.S. PATENT DOCUMENTS

| | | | |
|---|---|---|---|
| 2002/0010661 | A1 | 1/2002 | Waddington et al. |
| 2002/0120475 | A1 | 8/2002 | Morimoto |
| 2003/0179218 | A1 | 9/2003 | Martins et al. |
| 2005/0275831 | A1 | 12/2005 | Silver |
| 2011/0164163 | A1* | 7/2011 | Bilbrey .............. G06F 1/1694 348/333.01 |
| 2012/0230581 | A1 | 9/2012 | Miyashita et al. |
| 2013/0069985 | A1 | 3/2013 | Wong et al. |
| 2013/0233922 | A1* | 9/2013 | Schoening .......... G06Q 10/087 235/385 |
| 2014/0225916 | A1* | 8/2014 | Theimer ............. G06T 19/006 345/633 |
| 2014/0258052 | A1* | 9/2014 | Khuti .................. G06F 16/50 705/28 |
| 2015/0290795 | A1 | 10/2015 | Oleynik |
| 2016/0019497 | A1* | 1/2016 | Carvajal .............. G06Q 10/08 701/519 |
| 2016/0371553 | A1* | 12/2016 | Farnham, IV ...... G06F 3/04817 |
| 2017/0069135 | A1 | 3/2017 | Komaki et al. |
| 2017/0108577 | A1 | 4/2017 | Loverich et al. |
| 2019/0107411 | A1 | 4/2019 | Gil |
| 2019/0122174 | A1 | 4/2019 | Gil |

OTHER PUBLICATIONS

WUW—Wear ur world—A wearable gestural interface, Proceedings of the 27th International Conference Extended Abstracts on Human Factors in Computing Systems, CHI EA 2009, Boston, MA, Apr. 4, 2009, Mistry, P., et al., 7 pages, Aug. 29, 2017.

Visual Assist with a Laser Pointer and Wearable Display for Remote Collaboration, Proceedings of 2nd International Conference on Collaboration Technologies 2006, Tsukuba, Japan, Sakata, Nobuchika, et al., pp. 66-71.

Pick from Here!—An Interactive Mobile Cart using In-Situ Projection for Order Picking, Proceedings of UbiComp 2015, Osaka, Japan, Sep. 7, 2015, Funk, Markus, et al., 9 pages.

Mobile In-Situ Pick by Vision: Order Picking Support using a Projector Helmet, Proceedings of PETRA 2016, Corfu Island, Greece, Jun. 29, 2016, Funk, Markus, et al., 4 pages.

Interactive Dirt: Increasing Mobile Work Performance with a Wearable Projector-Camera System, Proceedings of UbiComp 2009, Orlando, Florida, Sep. 30, 2009, McFarlane, Daniel, et al., pp. 205-214.

Evaluation of a Mobile Projector-Based Indoor Navigation Interface, Nov. 6, 2013, Li, Ming, et al., Interacting with Computers, 19 pages, vol. 26, Issue No. 6, Sep. 29, 2014.

A Method for Wearable Projector Selection that Considers the Viewability of Projected Images, Dec. 1, 2010, Ota, Shuhei, et al., ACM Computers in Entertainment, Article 17, 16 pages, vol. 8, No. 3.

International Search Report and Written Opinion received for PCT Patent Application No. PCT/US18/00143, dated Dec. 4, 2018, 11 pages.

Final Office Action received for U.S. Appl. No. 15/798,551, dated Apr. 29, 2019, 17 pages.

Notice of Allowance received for U.S. Appl. No. 15/798,551, dated Sep. 11, 2019, 13 pages.

Preinterview first office action received for U.S. Appl. No. 16/707,134 dated Mar. 20, 2020, 4 pages.

* cited by examiner

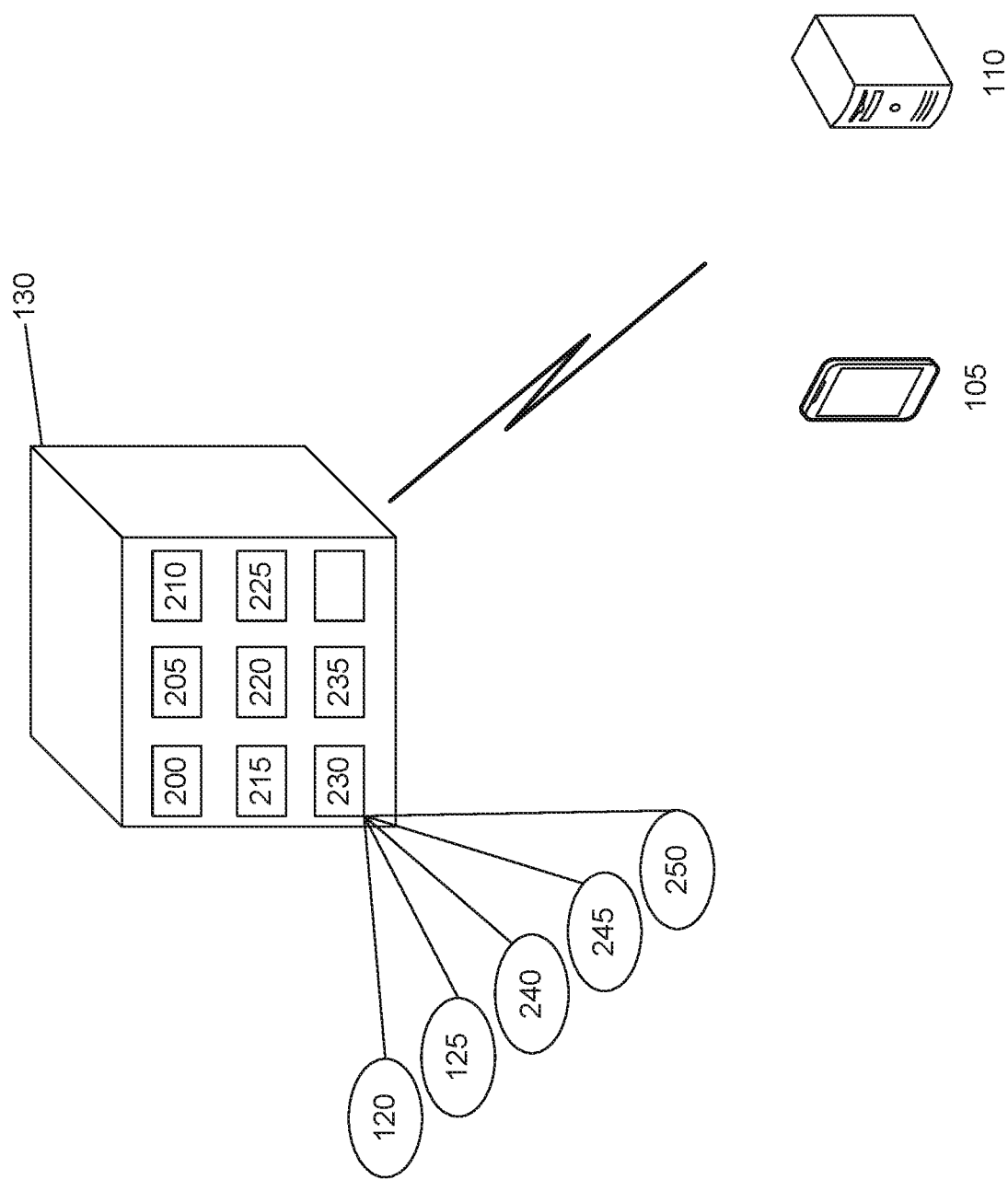

| SHIPMENT INFORMATION: SHIPMENT INFORMATION SEGMENT | | | |
|---|---|---|---|
| Data Element | Field Loc | Field Size | Field Description and Valid Values |
| SegmentIdentifier | 1 | 3 | *BA |
| ShipmentIdentifier | 4 | 35 | 1Z5600100300083767 |
| ConsigneeProfileIdentifier | | | 87EC2020-3AEA-4069-A2DD-08333B30854F |
| ConsignorProfileIdentifier | | | 21EC2020-3AEA-4069-A2DD-08002B30309D |
| PacakgeCount | 39 | 5 | 1 |
| ShipmentActualWeight | 44 | 17 | 35 |
| AveragePkgWeightInd | 61 | 1 | Set to Space |
| ShipmentDimWeight | 62 | 17 | 0 |
| UOMWeight | 79 | 3 | LBS |
| ServiceType | 82 | 2 | 3 |
| ShipmentChgType | 84 | 3 | PRE |
| PaymentMediaTypeCode | 87 | 2 | 10 |
| ConsignorName | 89 | 35 | Set to Spaces |
| DocInd | 124 | 1 | 3 |
| UOMDim | 125 | 2 | IN |
| CurrencyCode | 127 | 3 | USD |
| NumPackagesInShipment | 130 | 6 | 1 |
| ImageLocation | 136 | 48 | 1Z5600100300083767.images.carrier.com |

| SHIPMENT INFORMATION: ADDRESS INFORMATION SEGMENT | | | |
|---|---|---|---|
| Data Element | Field Loc | Field Size | Field Description and Valid Values |
| SegmentIdentifier | 1 | 3 | *PA |
| AddressQualifier | 4 | 2 | 18 |
| AttnName | 6 | 35 | John Billings |
| CompanyName | 41 | 35 | XYZ Company |
| Address1 | 76 | 35 | 123 Avenue B |
| Address2 | 111 | 35 | Set to Spaces |
| Address3 | 146 | 35 | Set to Spaces |
| City | 181 | 30 | New York |
| StateProv | 211 | 5 | NY |
| PostalCode | 216 | 9 | 10002 |
| Country | 225 | 2 | USD |
| PhoneNumber | 227 | 15 | 12125551234 |
| FaxInd | 242 | 1 | Set to Space |
| FaxNumber | 243 | 15 | 12125554321 |
| AccountNumber | 258 | 10 | Set to Spaces |
| TaxID | 268 | 15 | Set to Spaces |

| SHIPMENT INFORMATION: NOTIFICATION INFORMATION SEGMENT | | | |
|---|---|---|---|
| Data Element | Field Loc | Field Size | Field Description and Valid Values |
| SegmentIdentifier | 1 | 3 | *GA |
| RequestTypeCode | 4 | 3 | 6 |
| MediaTypeCode | 7 | 2 | 3 |
| RequestTypeEmailAddress | 9 | 50 | email_address@email.com |
| RequestTypeLanguageCode | 59 | 3 | Set to Spaces |
| RequestTypeDialect | 62 | 2 | Set to Spaces |
| SentFromName | 64 | 35 | Set to Spaces |
| ReplyToEmailAddress | 99 | 50 | Set to Spaces |
| FailureEmailAddress | 149 | 50 | Set to Spaces |
| FAXDestinationInd | 199 | 1 | Set to Space |
| DestinationFaxNumber | 200 | 15 | Set to Spaces |
| CompanyName | 215 | 35 | Set to Spaces |
| AttnName | 250 | 35 | Set to Spaces |
| Phone | 285 | 15 | Set to Spaces |
| SubjectCode | 300 | 2 | 1 |
| SubjectText | 302 | 75 | Set to Spaces |

| |
|---|
| 001 - Electronic Return / Electronic Label |
| 004 - Return / Label Created Notification |
| 005 - Inbound Return Notification |
| 006 - Ship Notification |
| 007 - Exception Notification |
| 008 - Delivery Notification |
| 009 - In-Transit Notification |
| 010 - Pre-Alert Notification |
| 011 - Electronic Export Information Filing Notification |
| 012 - Access Point Consignee Notification |

*FIG. 8.*

```
<?xml version="1.0"?>
<AccessRequest xml:lang="en-US">
    <AccessLicenseNumber>YourLicenseNumber</AccessLicenseNumber>
    <UserId>YourUserID</UserId>
    <Password>YourPassword</Password>
</AccessRequest>
<?xml version="1.0"?>
<ItemDataRequest xml:lang="en-US">
    <Request>
        <TransactionReference>
            <CustomerContext>Your Test Case Summary Description</CustomerContext>
            <XpciVersion>1.0</XpciVersion>
        </TransactionReference>
        <RequestAction>Track</RequestAction>
        <RequestOption>activity</RequestOption>
    </Request>
    <TrackingNumber>1Z56001003000083767</TrackingNumber>
</ItemDataRequest>
```

FIG. 10.

```
<?xml version="1.0" encoding="ISO-8859-1"?>
<ItemDataResponse>
    <Response>
        <TransactionReference>
            <CustomerContext>Your Test case summary Description</CustomerContext>
            <XpciVersion>1.0</XpciVersion>
        </TransactionReference>
        <ResponseStatusCode>1</ResponseStatusCode>
        <ResponseStatusDescription>Success</ResponseStatusDescription>
    </Response>
    *     *     *     *     *
    <ShipmentIdentificationNumber>ATrackingNumber</ShipmentIdentificationNumber>
    <Package>
        <TrackingNumber>ATrackingNumber</TrackingNumber>
        <Activity>
            <ActivityLocation>
                *     *     *     *     *
                <ImageLocation>1Z56001003000083767.images.carrier.com</ImageLocation>
            </ActivityLocation>
            *     *     *     *     *
            <Status>
                *     *     *     *     *
            </Status>
            <Date>20030313</Date>
            <Time>160000</Time>
        </Activity>
        *     *     *     *     *
    </Package>
    </Shipment>
</ItemDataResponse>
```

*FIG. 11.*

DISPLAYING ITEMS OF INTEREST IN AN AUGMENTED REALITY ENVIRONMENT

CROSS-REFERENCE TO RELATED APPLICATIONS

This application claims priority to U.S. Provisional Application No. 62/416,248 filed Nov. 2, 2016, which is hereby incorporated herein in its entirety by reference.

BACKGROUND

In attempting to identify particular items, a technical problem exists in providing an augmented/mixed reality environment that displays an actual image of the item or a proportionally dimensioned representation of the item to a user. To that end, a need exists for providing an augmented/mixed reality environment that displays an actual image of an item or a proportionally dimensioned representation of the item.

BRIEF SUMMARY

In general, embodiments of the present invention provide methods, apparatus, systems, computing devices, computing entities, and/or the like for providing an augmented reality display comprising an image of an item.

In accordance with one aspect, a method for providing an augmented reality display comprising an image of an item is provided. In one embodiment, the method comprises (1) receiving, via a user computing entity comprising one or more processors and a display, a communication transmitted from a beacon attached to an item; (2) identifying, via the user computing entity, a tracking identifier for the item from the communication transmitted from the beacon; (3) generating, via the user computing entity, a request for item information for the item, the request for the item information comprising the tracking identifier for the item; (4) receiving, via the user computing entity, a response with the item information for the item, the response comprising a uniform resource identifier for an image associated with the item; (5) retrieving, via the user computing entity, the image associated with the item using the uniform resource identifier; and (6) generating, via the user computing entity, an augmented reality display comprising the image associated with the item.

In accordance with another aspect, a computer program product for providing an augmented reality display comprising an image of an item is provided. The computer program product may comprise at least one computer-readable storage medium having computer-readable program code portions stored therein, the computer-readable program code portions comprising executable portions configured to (1) receive a communication transmitted from a beacon attached to an item; (2) identify a tracking identifier for the item from the communication transmitted from the beacon; (3) generate a request for item information for the item, the request for the item information comprising the tracking identifier for the item; (4) receive a response with the item information for the item, the response comprising a uniform resource identifier for an image associated with the item; (5) retrieve the image associated with the item using the uniform resource identifier; and (6) generate an augmented reality display comprising the image associated with the item.

In accordance with yet another aspect, an apparatus comprising a display, at least one processor, and at least one memory including computer program code is provided. In one embodiment, the at least one memory and the computer program code may be configured to, with the processor, cause the apparatus to (1) receive a communication transmitted from a beacon attached to an item; (2) identify a tracking identifier for the item from the communication transmitted from the beacon; (3) generate a request for item information for the item, the request for the item information comprising the tracking identifier for the item; (4) receive a response with the item information for the item, the response comprising a uniform resource identifier for an image associated with the item; (5) retrieve the image associated with the item using the uniform resource identifier; and (6) generate an augmented reality display comprising the image associated with the item.

In accordance with one aspect, a method for providing an augmented reality display comprising an image of an item is provided. In one embodiment, the method comprises (1) identifying, via a user computing entity comprising one or more processors and a display, a marker in a field of view of the user computing entity; (2) requesting, via the user computing entity, at least a portion of a dispatch plan associated with the marker; (3) causing, via the user computing entity, display of an item indicator associated with an item of the dispatch plan; (4) receiving, via the user computing entity, a selection of the item indicator associated with the item; (5) generating, via the user computing entity, a request for item information for the item, the request for the item information comprising a tracking identifier for the item; (6) receiving, via the user computing entity, a response with the item information for the item, the response comprising a uniform resource identifier for an image associated with the item; (7) retrieving, via the user computing entity, the image associated with the item using the uniform resource identifier; and (8) generating, via the user computing entity, an augmented reality display comprising the image associated with the item.

In accordance with another aspect, a computer program product for providing an augmented reality display comprising an image of an item is provided. The computer program product may comprise at least one computer-readable storage medium having computer-readable program code portions stored therein, the computer-readable program code portions comprising executable portions configured to (1) identify a marker in a field of view of the user computing entity; (2) request at least a portion of a dispatch plan associated with the marker; (3) cause display of an item indicator associated with an item of the dispatch plan; (4) receive a selection of the item indicator associated with the item; (5) generate a request for item information for the item, the request for the item information comprising a tracking identifier for the item; (6) receive a response with the item information for the item, the response comprising a uniform resource identifier for an image associated with the item; (7) retrieve the image associated with the item using the uniform resource identifier; and (8) generate an augmented reality display comprising the image associated with the item.

In accordance with yet another aspect, an apparatus comprising a display, at least one processor, and at least one memory including computer program code is provided. In one embodiment, the at least one memory and the computer program code may be configured to, with the processor, cause the apparatus to (1) identify a marker in a field of view of the user computing entity; (2) request at least a portion of a dispatch plan associated with the marker; (3) cause display of an item indicator associated with an item of the dispatch plan; (4) receive a selection of the item indicator associated with the item; (5) generate a request for item information for the item, the request for the item information comprising a tracking identifier for the item; (6) receive a response with the item information for the item, the response comprising a uniform resource identifier for an image associated with the item; (7) retrieve the image associated with the item using the uniform resource identifier; and (8) generate an augmented reality display comprising the image associated with the item.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1A is a diagram of a system that can be used to practice various embodiments of the present invention.

FIGS. 1B and 1C provide an indication of the interior of an illustrative powered asset.

FIG. 2 is a diagram of an information/data collection device that may be used in association with certain embodiments of the present invention.

FIGS. 6, 7, and 8 are illustrative information segments that can be used in accordance with various embodiments of the present invention.

Figure 9A:
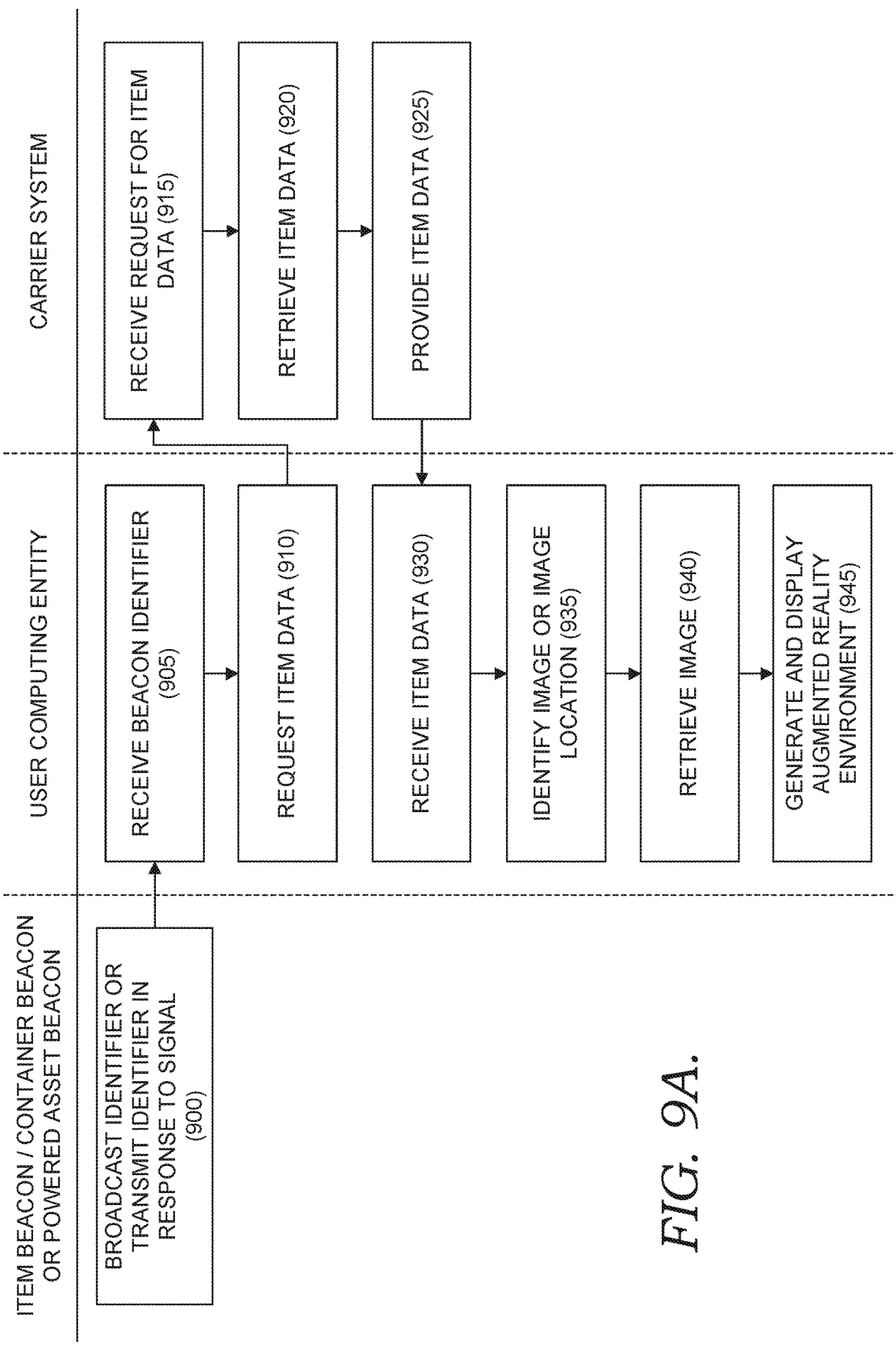
Figure 9B:
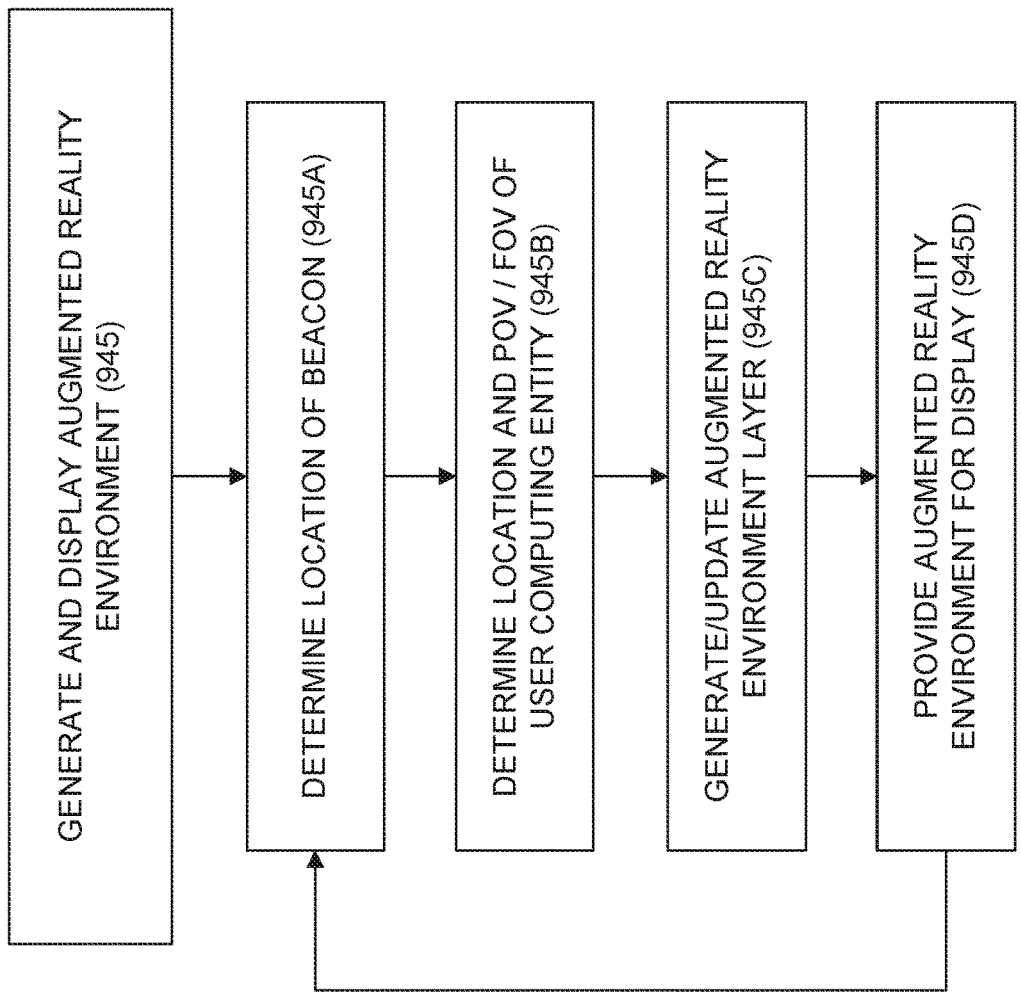

FIGS. 9A and 9B are flowcharts illustrating operations and processes that can be used in accordance with various embodiments of the present invention.

FIGS. 10 and 11 are illustrative application programming interface communications that can be used in accordance with various embodiments of the present invention.

Figure 12A:
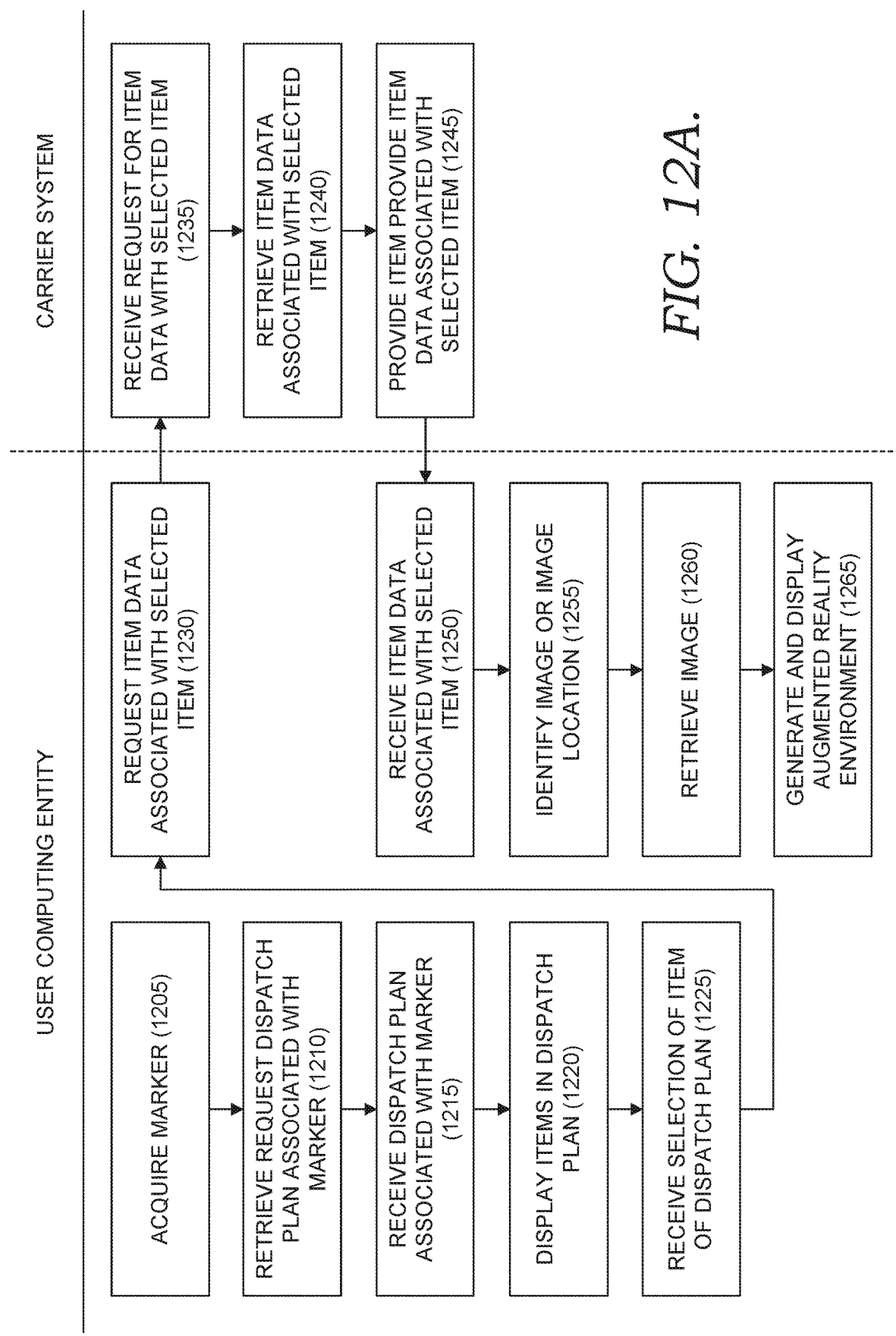
Figure 12B:
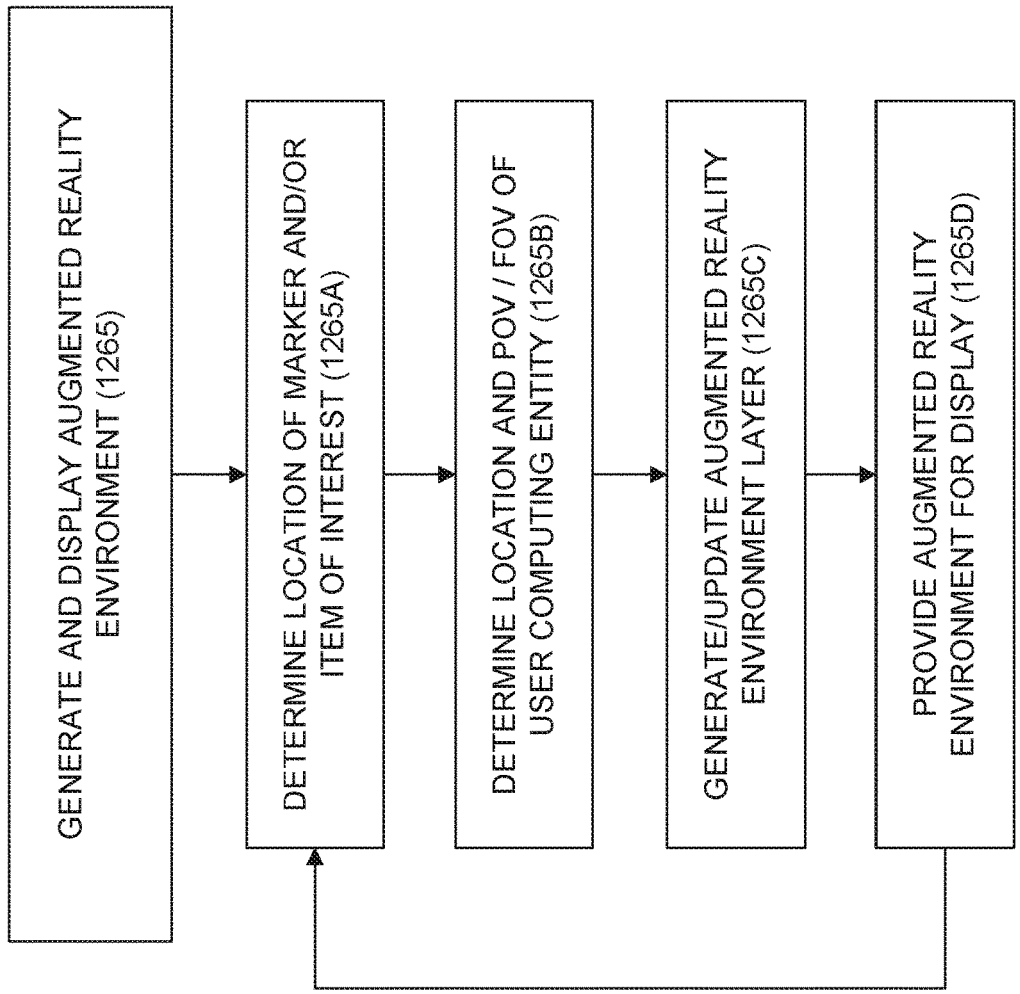

FIGS. 12A and 12B are flowcharts illustrating operations and processes that can be used in accordance with various embodiments of the present invention.

DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1A:
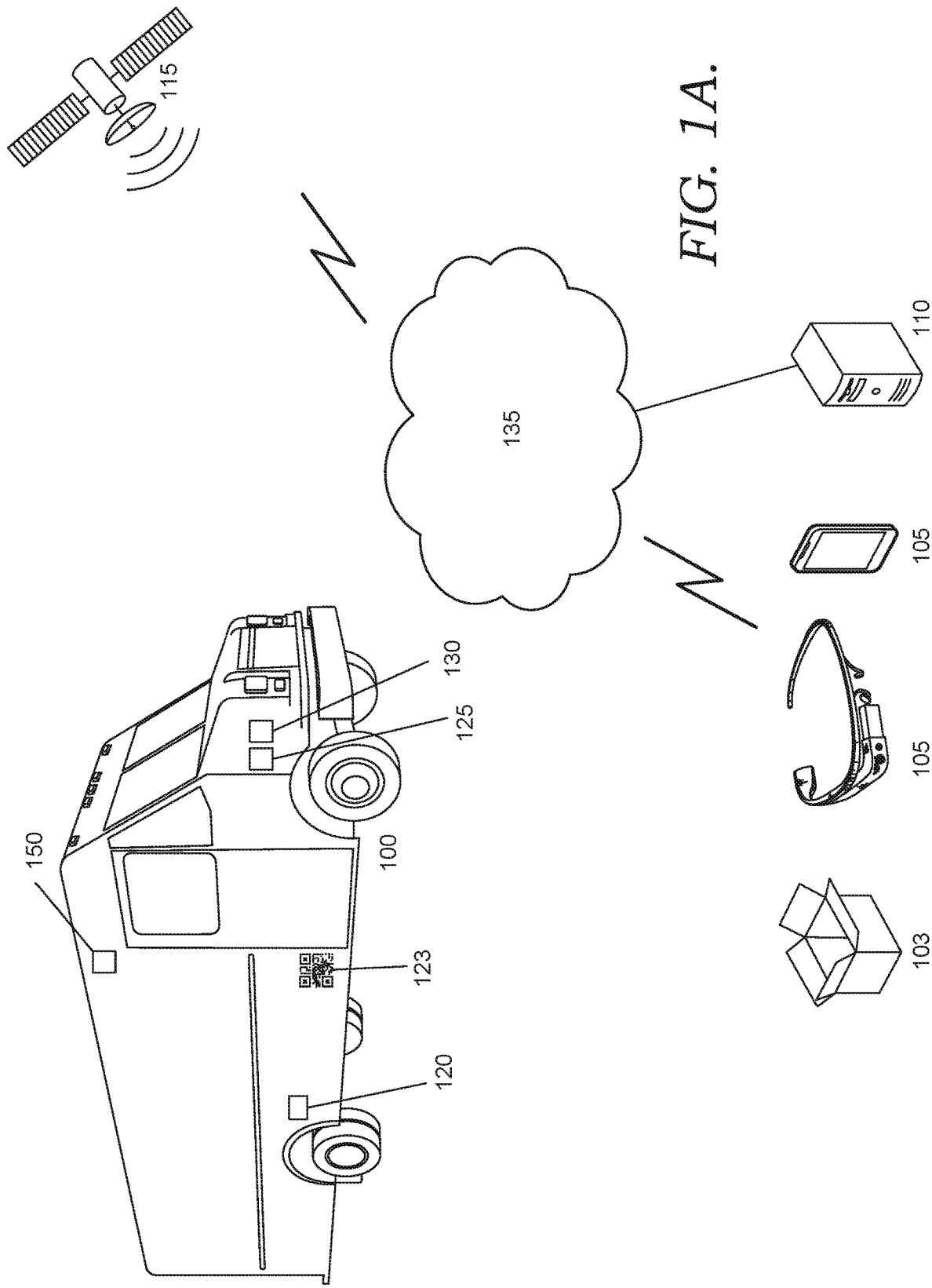

FIG. 1 provides an illustration of a system that can be used in conjunction with various embodiments of the present invention. As shown in FIG. 1, the system may include one or more powered assets 100, one or more items 103, one or more user computing entities 105, one or more containers 107, one or more carrier systems 110, one or more Global Positioning System (GPS) satellites 115, one or more location sensors 120, one or more telematics sensors 125, one or more information/data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

1. Exemplary Powered Asset

In various embodiments, the term powered asset 100 is used generically. For example, a powered asset 100 may be a tug, tractor, truck, car, van, flatbed, vehicle, aircraft-pushback tractor, cargo loader, forklift, and/or the like. As will be recognized, in many cases, a powered asset 100 may be configured to push, pull, lift, or otherwise transport containers 107 and or items 103. Further, each powered asset 100 may be associated with a unique powered asset identifier (such as a powered asset ID) that uniquely identifies the powered asset 100. The unique powered asset ID may include characters, such as numbers, letters, symbols, and/or the like. For example, an alphanumeric powered asset ID (e.g., "AS445") may be associated with each powered asset 100. In another embodiment, the unique powered asset ID may be a registration number or other identifying information/data assigned to the powered asset 100. The powered asset ID can may be represented as text, barcodes, tags, character strings, Aztec Codes, MaxiCodes, information/data Matrices, Quick Response (QR) Codes, and/or the like and positioned as markers 123 in a machine readable/detectable manner on the powered asset 100. The marker 123 can be used to generate and display an augmented/mixed reality environment based on the items 103 and/or containers 107 associated with the powered asset 100.

FIG. 1 shows one or more computing entities, devices, and/or similar words used herein interchangeably that are associated with the powered asset 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, watches, glasses, beacons, key fobs, radio frequency identification (RFID) tags, ear pieces, scanners, televisions, dongles, cameras, wristbands, wearable items/devices, items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a powered asset 100. The information/data collection device 130 may collect telematics information/data (including location data) and transmit/send the information/data to the user computing entity 105, the carrier system 110, and/or various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID/BLE tags/sensors 250, one or more power sources 220, one or more information/data radios 235 for communication with a variety of communication networks, one or more memory modules 210, and one or more programmable logic controllers (PLC) 225. It should be noted that many of these components may be located in the powered asset 100 but external to the information/data collection device 130. Thus, each of the components may be referred to individually or collectively as a powered asset computing entity.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, Global Navigation Satellite systems (GLONASS), the Chinese Compass navigation systems, Indian Regional Navigational satellite systems, and/or the like. Furthermore, the one or more location sensors 120 may be compatible with Assisted GPS (A-GPS) for quick time to first fix and jump starting the ability of the location sensors 120 to acquire location almanac and ephemeris data, and/or be compatible with Satellite Based Augmentation System (SBAS) such as Wide Area Augmentation System (WAAS), European Geostationary Navigation Overlay Service (EG-NOS), and/or MTSAT Satellite Augmentation System (MSAS), GPS Aided GEO Augmented Navigation (GA-GAN) to increase GPS accuracy. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular powered asset and/or the powered asset's operator and with various communication points (e.g., cellular towers or Wi-Fi access points) positioned at various locations throughout a geographic area to monitor the location of the powered asset 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the carrier system 110, the information/data collection device 130, user computing entity 105, and/or similar computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include powered asset sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and/or digital inputs from powered asset systems and sensors. The ECM 245 may further have information/data processing capability to collect and present telematics information/data to the J-Bus (which may allow transmission to the information/data collection device 130), and output standard powered asset diagnostic codes when received from a powered asset's J-Bus-compatible on-board controllers 240 and/or sensors.

Additionally, each powered asset 100 may have a powered asset beacon/tag/sensor 150 attached or affixed thereto. As will be recognized, a beacon/tag/sensor may take many forms. For instance, a beacon/tag/sensor may be a BLE tag, a beacon (e.g., a URIBeacon, an AltBeacon, or an iBeacon), an RFID beacon/tag/sensor, an NFC device, a Wi-Fi device, and/or the like. The powered asset beacon 150 can include some or all of the following components: one or more input interfaces for receiving information/data, one or more output interfaces for transmitting information/data, a processor, a clock, memory modules, one or more sensors for sensing and detecting various information/data, location determining aspects (such as those described in relation to the user computing entity 105), and a power source. The power source may be a source provided by the powered asset, an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each powered asset beacon 150 can store one or more unique identifiers, such as a global unique identifier (GUID), a universally unique identifier (UUID), a character string, an alphanumeric string, text string, and/or the like. The unique identifier may identify the associated powered asset 100 and/or powered asset beacon. Via various communication standards and protocols, the powered asset beacon 150 associated with the powered asset 100 can be communicated with, interrogated, read, and/or the like. For example, a container/item beacon 155 associated with a container 107 or an item 103 can communicate with the powered asset beacon 150 associated with the power asset 100 using multiple wireless communication standards and protocols, including Bluetooth, Wibree, NFC, Wi-Fi, ZigBee, and/or any other wireless protocol or standard. The powered asset beacon 150 associated with the powered asset 100 may also be in direct or indirect communication with the carrier system 110, the information/data collection device 130, user computing entity 105, and/or similar computing entities over the same or different wired or wireless networks.

As will be recognized, a powered asset beacon 150 can be used to sense and/or detect various information/data—including containers 107 and/or items 103 within its proximity. Additionally, a powered asset beacon 150 can be capable of sensing/collecting/determining temperature information/data, location information/data (such as described above and below), pressure information/data, altitude information/data, vacuum information/data, vibration information/data, shock information/data, humidity information/data, moisture information/data, light information/data, air information/data, and/or the like. In one embodiment, a powered asset beacon 150 may be operated in one or more operating modes, such as advertising/broadcasting mode, listening mode, sleep mode, and/or the like. In advertising/broadcasting mode, the powered asset beacon 150 may transmit an advertising signal regularly, periodically (e.g., 10 times/second), and/or continuously. The advertising signal may include one or more unique identifiers (e.g., powered asset information and/or unique powered asset beacon identifier), received signal strength indicator (RSSI) information/data, and/or other information/data. In listening mode, the powered asset beacon 150 is capable of receiving signals transmitted by other beacons and/or other computing entities. In sleep mode, the powered asset beacon 150 may cut power to unneeded subsystems and place the other subsystems (e.g., receiver, processor) into a configurable low power state (e.g., with just sufficient power for the powered asset beacon 150 to detect triggers/events for it to change/switch from sleep mode into other operational modes (e.g., listening mode, advertising mode)). The change of the operational mode may be triggered by various configurable triggers/events, such as pressure, altitude, motion, location, light, sound, time, signal transmitted from another beacon and/or an appropriate computing entity, a switch, a button, combinations thereof, and/or the like.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the powered asset 100 in which the information/data collection device 130 is installed, specific to the geographic area in which the powered asset 100 will be traveling, specific to the function the powered asset 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols (including Bluetooth Low Energy (BLE)), ZigBee, Wibree, wireless universal serial bus (USB) protocols, and/or any other wireless protocol.

Although the preceding was described in the context of a powered assets 100, the same concepts can apply to other contexts and facilities, such as warehouses, buildings, storage facilities, shipping yards, and/or the like. In such embodiments, the facilities may include one or more components described above, including beacons affixed to various locations throughout the facilities. As will be recognized, a variety of other approaches and techniques can be used to adapt to various needs and circumstances.

c. Containers and/or Items

In one embodiment, a container 107 may be configured to store and transport one or more items 103 (e.g., shipments, packages, pallets, etc.) of varying shapes and sizes and be stored upon or in one or more powered assets. For instance, in various embodiments, a container 107 may be a unit load device (ULD) used to store and transport items 103 on tractor/trailer combinations or an aircraft. An item 103 may be any tangible and/or physical object. In one embodiment, an item 103 may be or be enclosed in one or more packages, envelopes, parcels, bags, goods, products, loads, crates, items banded together, drums, the like, and/or similar words used herein interchangeably.

In one embodiment, each container 107 and/or item 103 may include and/or be associated with a unique tracking identifier, such as an alphanumeric identifier or machine readable identifier. Such tracking identifiers may be represented as text, barcodes, tags, character strings, Aztec Codes, MaxiCodes, information/data Matrices, QR Codes, electronic representations, and/or the like. A unique tracking identifier (e.g., 1Z5600100300083767) may be used by a carrier to identify and track containers 107 and items 103 as they move through a carrier's transportation network. For example, information/data comprising a tracking identifier can be read, scanned, transmitted, advertised, and/or the like to provide and/or identify/determine the location of a container 107 and/or item 103 103. As will be recognized, items 103 can be associated with a container 107 and therefore associated items 103 can be considered to be located in the container 107 at the determined location of the container 107. These can be referred to as "logical" scans/determinations or "virtual" scans/determinations.

Such tracking identifiers can be affixed to items by, for example, using a sticker (e.g., label) with the unique tracking identifier printed thereon (in human and/or machine readable form). In other embodiments, a container/item beacon/tag/sensor 155 or an RFID/BLE beacon/tag/sensor may be affixed to or associated with each container 107 and/or item 103 and store a unique tracking identifier. As previously noted, a beacon/tag/sensor may take many forms. For example, a beacon/tag/sensor may be a BLE tag, a beacon (e.g., a URIBeacon, an AltBeacon, or an iBeacon), an RFID beacon/tag/sensor, a BLE beacon/tag/sensor, an NFC device, a Wi-Fi device, and/or the like. The container/item beacon 155 can include some or all of the following components: one or more input interfaces for receiving information/data, one or more output interfaces for transmitting information/data, a processor, a clock, memory modules, one or more sensors for sensing and detecting various information/data, and a power source. The power source may be an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each container/item beacon 155 can store one or more unique identifiers, such as a tracking identifier for the corresponding item 103. The unique identifier may identify the associated container 107 (and/or item 103 103) and/or container/item beacon 155. Via various communication standards and protocols, the container/item beacon 155 associated with the container 107 and/or item 103 can be communicated with, interrogated, read, and/or the like. For example, the container/item beacon 155 associated with the container 107 and/or item 103 can communicate with a powered asset beacon 150 associated with a powered asset 100 using multiple wireless communication standards and protocols, including Bluetooth, Wibree, NFC, Wi-Fi, ZigBee, and/or any other wireless protocol or standard. The container/item beacon 155 associated with the container 107 and/or item 103 may also be in direct or indirect communication with a carrier system 110, an information/data collection device 130, a user computing entity 105, and/or similar computing entities over the same or different wired or wireless networks.

As will be recognized, a container/item beacon 155 can be used to store (e.g., item information/data, sense, detect, and collect various information/data. For example, a container/item beacon 155 can be capable of sensing/collecting/determining temperature information/data, pressure information/data, altitude information/data, vacuum information/ data, vibration information/data, shock information/data, humidity information/data, location information/data (such as described above and below), moisture information/data, light information/data, air information/data, and/or the like. In one embodiment, a container/item beacon 155 may be operated in one or more operating modes, such as advertising mode, listening mode, sleep mode, and/or the like. In advertising mode, the container/item beacon 155 may transmit an advertising signal regularly, periodically (e.g., 10 times/second), and/or continuously. The advertising signal may include one or more unique identifiers (e.g., unique container identifier and/or unique container/item beacon identifier), RSSI information/data, and/or other information/data. In listening mode, the container/item beacon 155 is capable of receiving signals transmitted by other beacons, and/or an appropriate computing entities. In sleep mode, the container/item beacon 155 may cut power to unneeded subsystems and place the other subsystems (e.g., receiver, processor) into a configurable low power state (e.g., with just sufficient power for the container/item beacon 155 to detect triggers/events for it to change/switch from sleep mode into other operational modes (e.g., listening mode, advertising mode)). The change of the operational mode may be triggered by various configurable triggers/events, such as pressure, altitude, motion, light, location, sound, time, signal transmitted from another beacon and/or an appropriate computing entity, a switch, a button, combinations thereof, and/or the like.

d. Exemplary Carrier System

Figure 3:
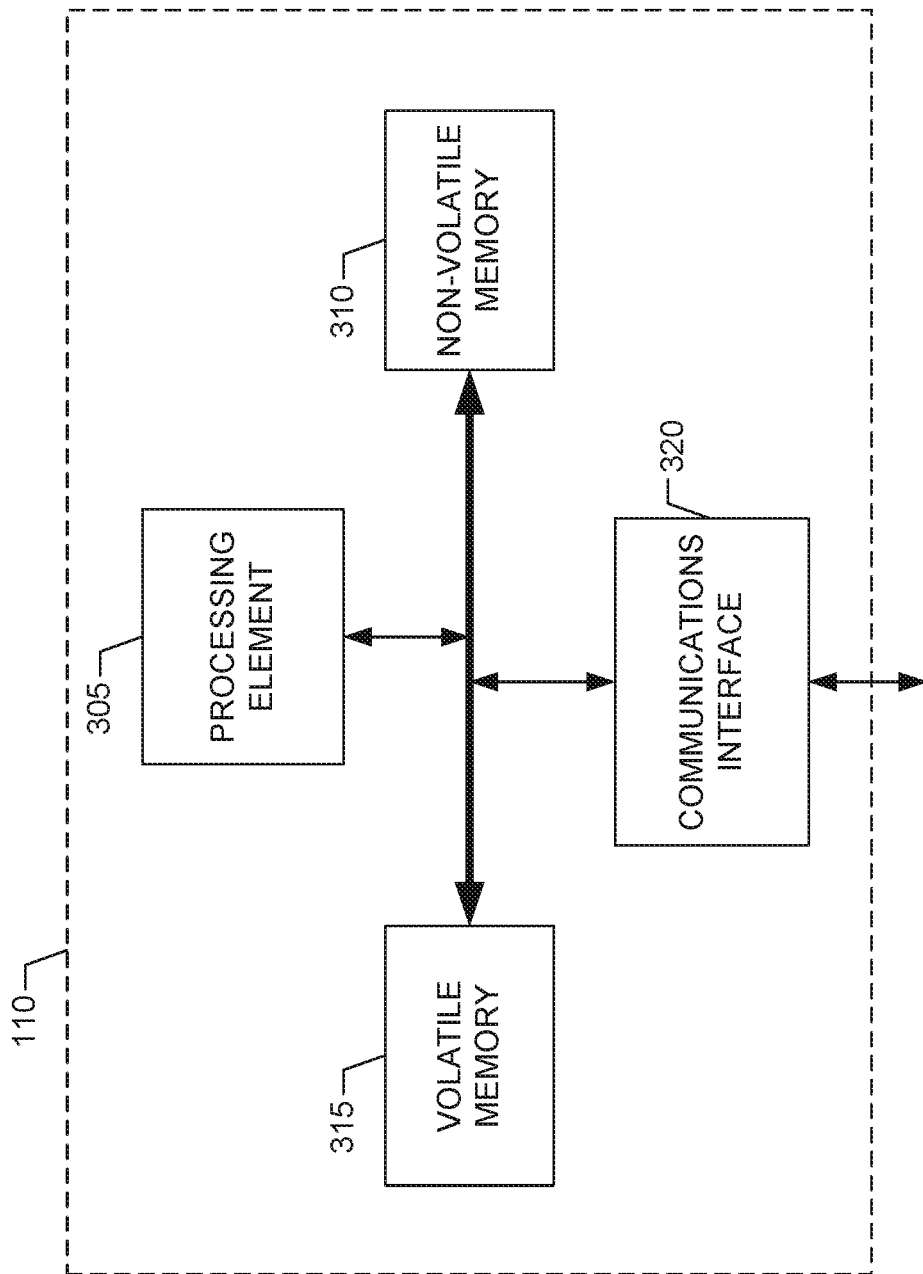
FIG. 3 is a schematic of a carrier system in accordance with certain embodiments of the present invention.

FIG. 3 provides a schematic of a carrier system 110 according to one embodiment of the present invention. The carrier system can be operated by a variety of entities, including a carrier. A carrier may be a traditional carrier, such as United Parcel Service, FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like.

In general, the terms computing entity, entity, device, system, and/or similar words used herein interchangeably may refer to, for example, one or more computers, computing entities, desktop computers, mobile phones, tablets, phablets, notebooks, laptops, distributed systems, servers or server networks, blades, gateways, switches, processing devices, processing entities, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier system 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the carrier system 110 may communicate with powered assets 100, user computing entities 105, and/or the like.

As shown in FIG. 3, in one embodiment, the carrier system 110 may include or be in communication with one or more processing elements 305 (also referred to as processors, processing circuitry, and/or similar terms used herein interchangeably) that communicate with other elements within the carrier system 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier system 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the carrier system 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the carrier system 110 with the assistance of the processing element 305 and operating system.

As indicated, in one embodiment, the carrier system 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the carrier system 110 may communicate with computing entities or communications interfaces of the powered asset 100, user computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier system 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, Zigbee, Wibree, and/or any other wireless protocol. Although not shown, the carrier system 110 may include or be in communication with one or more input elements, such as a keyboard input, a mouse input, a touch screen/display input, audio input, pointing device input, joystick input, keypad input, and/or the like. The carrier system 110 may also include or be in communication with one or more output elements (not shown), such as audio output, video output, screen/display output, motion output, movement output, and/or the like.

As will be appreciated, one or more of the carrier system's 110 components may be located remotely from other carrier system 110 components, such as in a distributed system. Furthermore, one or more of the components may be combined and additional components performing functions described herein may be included in the carrier system 110. Thus, the carrier system 110 can be adapted to accommodate a variety of needs and circumstances.

e. Exemplary User Computing Entity

Figure 4:
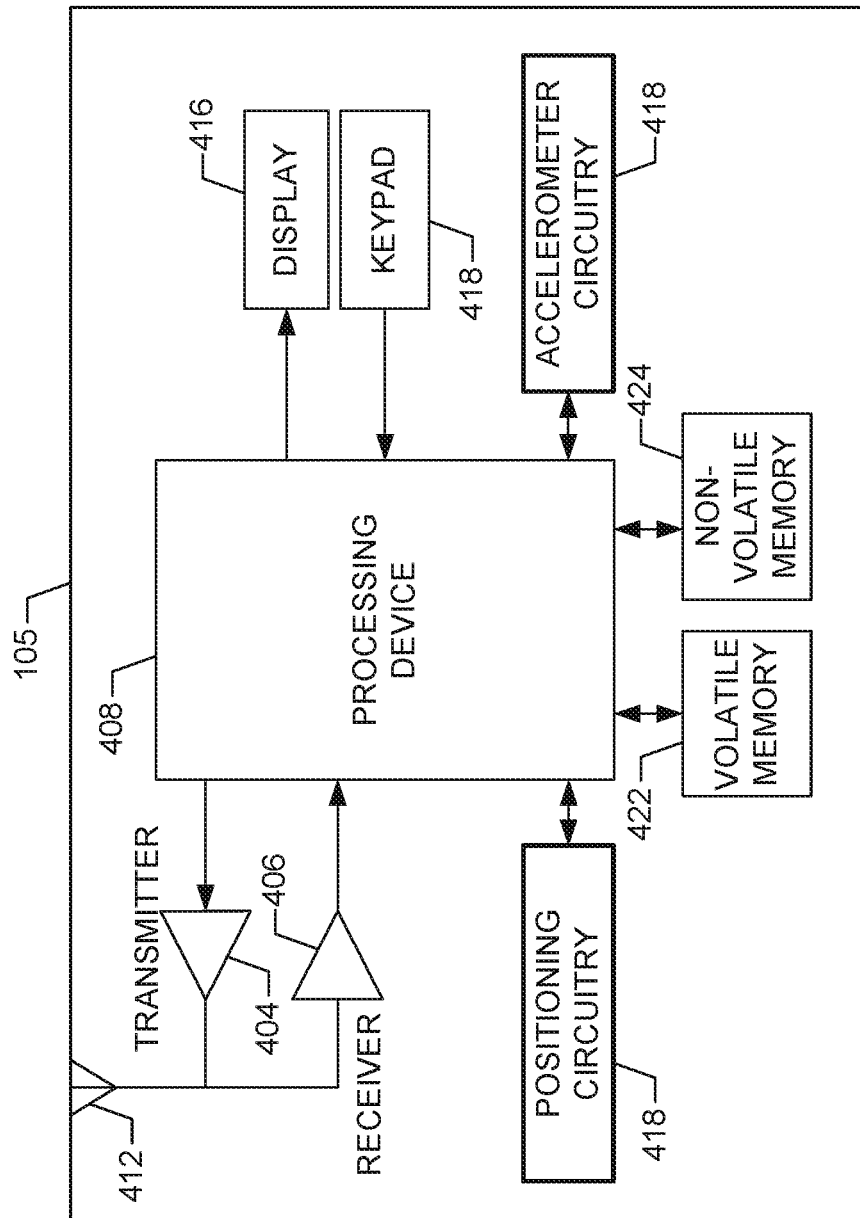
FIG. 4 is a schematic of a user computing entity in accordance with certain embodiments of the present invention.

FIG. 4 provides an illustrative schematic representative of a user computing entity 105 that can be used in conjunction with embodiments of the present invention. In one embodiment, the user computing entity 105 may be one or more mobile phones, tablets, watches, glasses (e.g., Google Glass, Vuzix M-100, SeeThru, Optinvent ORA-S, and the like), wristbands, wearable items/devices, head-mounted displays (HMDs) (e.g., Oculus Rift, Sony HMZ-T3W, and the like), the like, and/or any combination of devices or entities adapted to perform the functions, operations, and/or processes described herein. The term user computing entity 105 is intended to refer to any device that projects, superimposes, overlays, or otherwise provides an image on a surface with respect to a user's viewing angle or line of vision or a user computing entity's angle. The term user computing entity 105 is intended to also include any other peripheral electronics and functionality that may be provided in conjunction with such devices. For example, a user computing entity 105 may include speakers, headphones, or other electronic hardware for audio output, a plurality of display devices (e.g., the use of two display devices, one associated with each of the user's eyes, to enable a stereoscopic, three-dimensional viewing environment), one or more position sensors (e.g., gyroscopes, global positioning system receivers, and/or accelerometers), beacons for external sensors (e.g., infrared lamps), or the like. In one embodiment, the user computing entity can be used to provide an augmented reality environment/area, environment/area mixed reality environment/area, and/or similar words used herein interchangeably to a user. The terms augmented/mixed reality environment/area should be understood to refer to a combined environment/area including the physical environment/area and elements of a virtual environment/area.

In one embodiment, a user computing entity may be used by carrier personnel and provide the carrier personnel with an augmented/mixed reality environment. In one embodiment, the user computing entities 105 may include one or more components that are functionally similar to those of the carrier system 110 and/or as described below. As will be recognized, user computing entities 105 can be operated by various parties, including personnel loading, unloading, delivering, and/or transporting containers 107 and/or items 103.

As shown in FIG. 4, a user computing entity 105 can include an antenna 412, a transmitter 404 (e.g., radio), a receiver 406 (e.g., radio), and a processing element 408 that provides signals to and receives signals from the transmitter 404 and receiver 406, respectively. The signals provided to and received from the transmitter 404 and the receiver 406, respectively, may include signaling information/data in accordance with an air interface standard of applicable wireless systems to communicate with various entities, such as powered assets 100, carrier systems 110, and/or the like. In this regard, the user computing entity 105 may be capable of operating with one or more air interface standards, communication protocols, modulation types, and access types. More particularly, the user computing entity 105 may operate in accordance with any of a number of wireless communication standards and protocols. In a particular embodiment, the user computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, USB protocols, Bluetooth protocols, Wibree protocols, NFC protocols, Wi-Fi protocols, ZigBee protocols, and/or any other wireless protocol or standard.

Via these communication standards and protocols, the user computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

According to one embodiment, the user computing entity 105 may include location determining aspects, devices, modules, functionalities, and/or similar words used herein interchangeably-positioning circuitry 426. For example, the user computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, GLONASS, the Chinese Compass navigation systems, Indian Regional Navigational satellite systems, and/or the like. Additionally, the location module may be compatible with A-GPS for quick time to first fix and jump starting the ability of the location module to acquire location almanac and ephemeris data, and/or be compatible with SBAS such as WAAS, EGNOS, MSAS, and/or GAGN to increase GPS accuracy. Alternatively, the location information/data may be determined by triangulating the user computing entity's 105 position in connection with a variety of other systems, including cellular towers, Wi-Fi access points, and/or the like. Similarly, the user computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID/BLE tags, indoor beacons or transmitters, Wi-Fi access points, cellular towers, nearby computing devices (e.g., smartphones, laptops) and/or the like. For instance, such technologies may include iBeacons, Gimbal proximity beacons, BLE receivers and/or transmitters, NFC receivers and/or transmitters, and/or the like. These positioning aspects can be used in a variety of settings to determine the location of someone or something to within inches or centimeters.

The user computing entity 105 may also detect markers 123 and/or target objects (e.g., items 103). For example, the user computing entity 105 may include readers, scanners, cameras, sensors, and/or the like for detecting when a marker 123 and/or target object is within its point-of-view (POV)/field-of-view (FOV) of the real world environment/area. For example, readers, scanners, cameras, sensors, and/or the like may include RFID readers/interrogators to read RFID tags, scanners and cameras to capture visual codes (e.g., text, barcodes, character strings, Aztec Codes, MaxiCodes, information/data Matrices, QR Codes, electronic representations, and/or the like), and sensors to detect beacon signals transmitted from target objects or the environment/area in which target objects are located.

In one embodiment, the user computing entity 105 may include accelerometer circuitry 428 for detecting movement, pitch, bearing, orientation, and the like of the user computing entity 105. This information/data may be used to determine which area of the augmented/mixed reality environment/area corresponds to the orientation/bearing of the user computing entity 105 (e.g., x, y, and z axes), so that the corresponding environment/area of the augmented/mixed reality environment/area may be displayed via the display 416 along with a displayed image. For example, the user computing entity 105 may overlay an image in a portion of the user's POV/FOV of the real world environment/area.

The user computing entity 105 may include a camera (not shown) to capture images of the environment/area of the user computing entity 105 from a particular POV/FOV. The POV/FOV of the camera may correspond to the direction of the user computing entity 105 and therefore the POV/FOV of the user. With the POV/FOV, images can be presented to the user of target objects (e.g., items 103 or a specific item 103) that are within the environment/area of the user computing entity 105. For example, while a carrier personnel is going about his daily work, the user computing entity 105 can display the corresponding environment/area and images overlaid on the same. The displayed image may include images (e.g., stock images of items 103 or actual images of items 103), text (sorting instructions or warnings), video (e.g., handling procedures), menus, selection boxes, navigation icons, and/or the like.

The user computing entity 105 may also comprise a user interface (that can include a display 416 coupled to a processing element 408) and/or a user input interface (coupled to a processing element 408). For example, the user input interface can comprise any of a number of devices allowing the user computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity can collect contextual information/data as part of the telematics data.

The user computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 105.

III. EXEMPLARY SYSTEM OPERATION

Reference will now be made to FIGS. 5A, 5B, 6-8, 9A, 9B, 10-11, 12A and 12B. FIGS. 5A, 5B, 9A, 9B, 12A and 12B are flowcharts illustrating operations and processes that can be used in accordance with various embodiments of providing an augmented/mixed reality environment that displays an actual image of the item or a proportionally dimensioned representation of the item to a user.

1. Container/Item Data

Figure 5A:
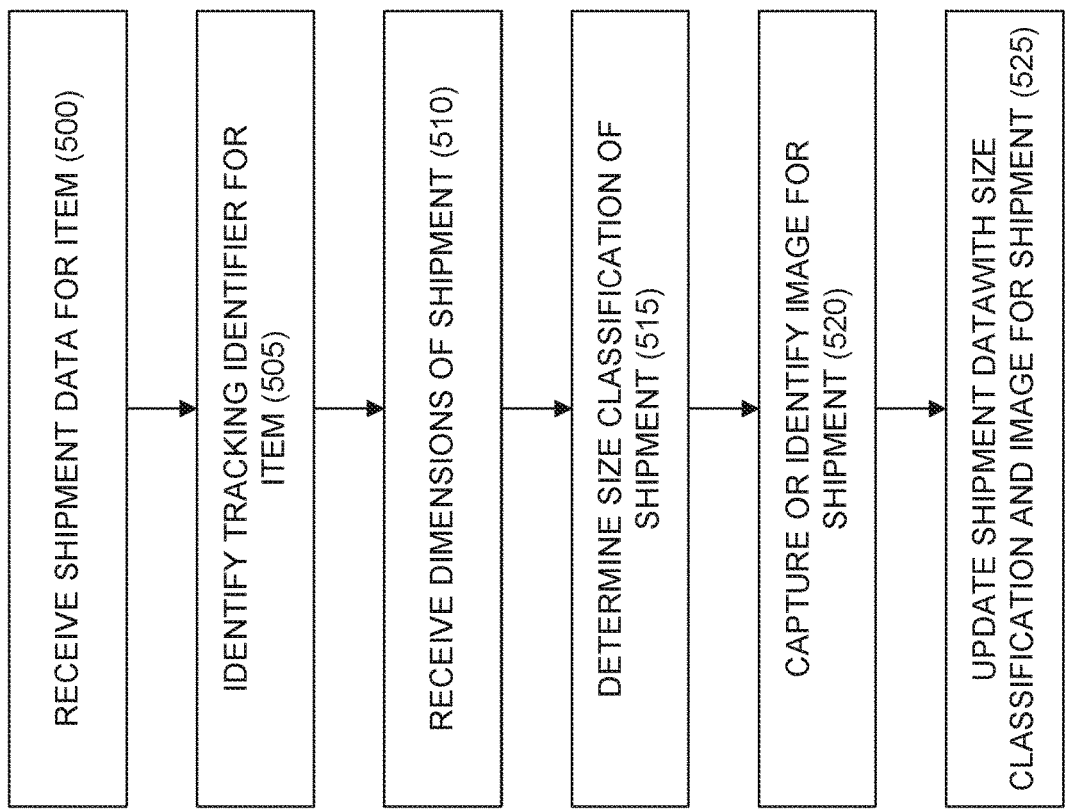
FIGS. 5A and 5B are flowcharts illustrating operations and processes that can be used in accordance with various embodiments of the present invention.
Figure 5B:
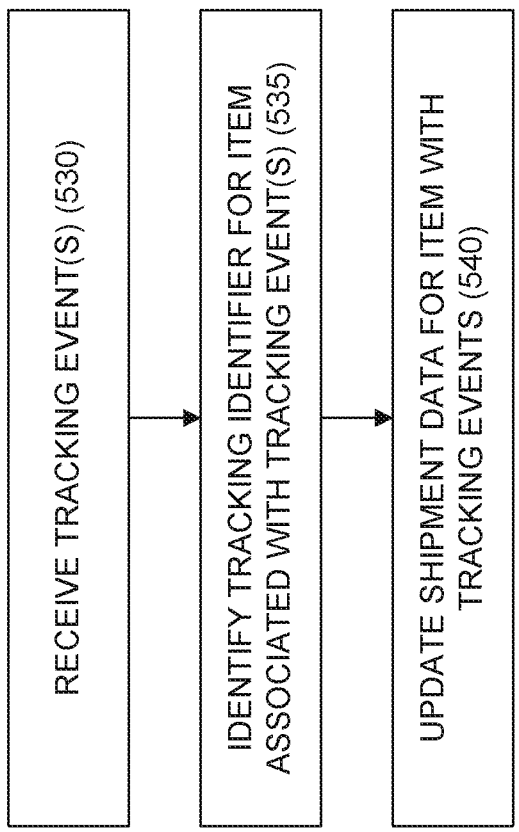

In one embodiment, the process may begin by the carrier system 110 (or other appropriate computing entity) generating and/or receiving item information/data for one or more items 103 (operation/step 500 of FIG. 5A). For example, a customer may initiate the shipping process by providing information/data to the carrier system 110. In various embodiments, the customer (e.g., a customer or customer representative operating a customer computing entity) may access a webpage, application, dashboard, browser, or portal of a carrier. After the customer is identified (e.g., based on his or her profile), the customer may initiate shipment of an item 103. In various embodiments, the carrier system 110 may provide a user interface (e.g., browser, dashboard, application) for the customer to provide item information/data which includes certain details regarding the item 103. In various embodiments, the item information/data may include a name, street address, city, state, postal code, country, telephone number, and/or the like for the consignor and/or the consignee. In various embodiments, the user interface may comprise a fillable form with fields including ship-from information/data and ship-to information/data. In various embodiments, some of the information/data fields may be pre-populated. For example, if the customer logged into a registered account/profile, the address information/data entered during registration may be pre-populated in certain information/data fields. In some embodiments, the customer may also have a digital address book associated with the account comprising address information/data for possible ship-to and/or ship-from information/data (see FIGS. 4, 5, and 6). The customer may be able to select certain ship-to and/or ship-from information/data from the address book for the associated shipment.

In one embodiment, after the carrier system 110 receives the ship-to and/or ship-from information/data from the customer, the carrier system 110 may perform one or more validation operations. For example, the carrier system 110 may determine whether the primary address (and/or other addresses) in the specified country or postal code is eligible for a pick-up or delivery. The carrier system 110 may also determine whether the primary address (and/or other secondary addresses) is valid, e.g., by passing the primary address through one or more address cleansing or standardization systems. The carrier system 110 may perform a variety of fraud prevention measures as well, such as determining whether the customers (or one of the delivery addresses) have been "blacklisted" from pick-up and/or delivery services. As will be recognized, a variety of other approaches and techniques can be used to adapt to various needs and circumstances.

In addition to ship-to and/or ship-from information/data, the item information/data may also include service level information/data (see FIGS. 4, 5, and 6). The service level options may be, for example, Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like.

In one embodiment, the carrier system 110 may receive or determine item characteristics/attributes and store the characteristics/attributes in the item information/data (see FIGS. 4, 5, and 6). The characteristics/attributes may include the dimensions, weight, shipping classifications, planned movements in the carrier's transportation and logistics network, planned times, and/or the like for various items 103 (operations/steps 505 and 510 of FIG. 5A). For example, the length, width, height, base, radius, and weight can be received as input information/data from a user and/or can be determined or collected by various types of carrier equipment. For example, sensors or cameras may be positioned to capture and/or determine the length, width, height, and weight (including dimensional weight) of an item 103 as it moves along a conveyor, moves in or out of a loading bay, is transported by a lift truck, is transported through the carrier's transportation and logistics network, and/or the like. In one embodiment, with such information/data received or captured, the carrier system 110 can determine/identify the cube/volume for each item 103. The units of measurement for the equations may be established so that the size produced by the determinations is in cubic feet, cubic inches, or any other volumetric measure. In one embodiment, after determining the cube/volume for an item 103 (and/or making various other determinations), the carrier system 110 can apply a classification to the item 103 based at least in part on the cube/volume (operation/step 515 of FIG. 5A). The classifications may include (1) size category one items, (2) size category two items, (3) size category three items, (4) size category four items 103, and/or the like. By way of example, (1) size category one items may be defined as being within >0 and ≤2 cubic feet, (2) size category two items may be defined as being within >2 and ≤4 cubic feet, (3) size category three items may be defined as being within >4 and ≤6 cubic feet, (4) size category four items may be defined as being over >6 cubic feet, and/or the like.

In one embodiment, each category may be associated with one or more images (operation/step 520 and 525 of FIG. 5A). An image may be in a variety of still formats (2D and/or 3D), such as .jpg, .bmp, .tif, .png, .raw, .daz, .1xf, .ccp, .p31, .xaf, .xmf, and/or the like. Further, the one or more images may also be in a variety of video formats (2D and/or 3D), such as .gif, .webm, .mkv, .flv, .avi, .mov, .qt, .wmv, .mpg, .mp4, u3d, x3d, 3dxml, and/or the like. In one embodiment, size category one items may be associated with a stock (still or video) image that can be displayed proportionally to the surrounding environment/area based on the user's location, position, and FOV/POV. The other categories may have similar stock images associated with them that can be associated with individual items 103: (1) stock-size-one.images.carrier.com; (2) stock-size-two.images.carrier.com; (3) stock-size-three.images.carrier.com; and (4) stock-size-four.images.carrier.com. The images can be stored in a database and/or be accessible via one or more uniform resource identifiers (URIs) or uniform resource locators (URLs). In one embodiment, after the carrier system 110 determines the classification for a specific item 103, the carrier system 110 can store the image for the category in association with item information/data for the specific item 103. For example, for an item 103 associated with tracking identifier 1Z5600100300083767 and being categorized as size category one, the carrier system 110 can store the stock image location in association with the item information/data—e.g., a reference to the location of the stock image: stock-size-one.images.carrier.com (see FIG. 6).

In another embodiment, an actual image of each item 103 can be captured and stored as or in association with the item information/data (operation/step 520 and 525 of FIG. 5A). For example, one or more cameras or imaging devices can automatically capture an image (still or video) of a specific item 103 as it moves along a conveyor, moves in or out of a loading bay, is transported by a lift truck, is transported through the carrier's transportation and logistics network, and/or the like. With the tracking identifier captured for the item, the carrier system 110 can associate the captured image with the item information/data for the item, such as by "stamping" the image with the tracking identifier, storing the tracking identifier as associated metadata, storing the tracking identifier as part of the file, storing the tracking identifier in an image container, and/or the like. For instance, if the item 103 associated with tracking identifier 1Z5600100300083767 is being transported on a conveyor, the tracking identifier can be scanned/read/received and an image of the item 103 can be captured. With the captured images (still or video), the carrier system 110 can store the image in association with the item information/data: 1Z5600100300083767.images.carrier.com (See FIG. 6). The images can be stored in a database and/or be accessible via one or more URIs or URLs. This allows the image(s) to be stored as or in association with the item information/data and/or be requested, retrieved, provided, and used for display in an augmented/mixed reality environment/area.

As necessary, various computing entities can request and retrieve images associated with containers 107 and/or items 103. For instance, if a user computing entity 105 receives information/data indicating that the item 102 associated with tracking identifier 1Z5600100300083767 is within its proximity, the user computing entity 105 can send a request for the item information/data to a variety of computing entities, including the carrier system 110. In response, the user computing entity 105 can receive the item information/data for the item 103. Exemplary locations for storing such images may include uniform resource identifiers (URIs) and uniform resource locators (URLs): stock-size-one.images-.carrier.com or 1Z5600100300083767.images.carrier.com. In one embodiment, the item information/data may include the corresponding image itself or the address of the image. As will be recognized, a variety of other approaches and techniques can be used to adapt to various needs and circumstances.

The item information/data can be stored in a variety of ways. For example, FIGS. 6, 7, and 8 show illustrative information/data segments. FIG. 6 illustrates an exemplary shipment information/data segment. FIG. 7 illustrates an exemplary address information/data segment. And FIG. 8 illustrates an exemplary notification information/data segment. In one embodiment, the image location is stored in the ImageLocation field that begins at position 136 for 48 positions in the shipment information/data segment. This figure also shows the image location (and/or images) stored by the carrier system 110 in association with the unique tracking identifier. Thus, the carrier system 110 (or various other computing entities) can have access the images of the corresponding item 103 via the tracking identifier. For instance, if a user computing entity 105 later scans, reads, or otherwise receives a tracking identifier for an item 103 (e.g., 1Z5600100300083767), the user computing entity 105 can request one or more images of the corresponding item 103 from the carrier system 110. Responsive to receiving the request, the carrier system 110 can access the shipping information/data stored, for example, in one or more databases and provide the one or more images (and/or image locations) to the user computing entity 105. The user computing entity 105 can the use the one or more images to generate and render an augmented/mixed reality environment. As will be recognized, a variety of other approaches and techniques can be used to adapt to various needs and circumstances.

2. Container and/or Item Tracking

In one embodiment, the item information/data may also include tracking information/data (of various "tracking events") corresponding to the location of a container 107 and/or an item 103 in the transportation and logistics network. To determine and reflect a container's or an item's movement, a tracking identifier (e.g., 1Z5600100300083767) associated with the same may, for example, be scanned or otherwise electronically read or received at various points as the container 107 and/or item 103 are transported through the carrier's transportation and logistics network (operation/step 530 of FIG. 5B). As indicated in operations/steps 535 and 540 of FIG. 5B, with a tracking identifier, the item information/data for the container 107 and/or item 103 can be updated to reflect the latest or most-recent tracking events (e.g., tracking information/data)—e.g., associating the item 103 with the particular origin entity, destination entity, bundle/container, vehicle, employee, location, facility, and/or the like. An appropriate computing entity can update the item information/data with each tracking event to provide a history of the item's movement through the carrier's transportation and logistics network.

For example, in the context of an initial or intermediate transportation leg/segment, items 103 are often transported in containers 107 by powered assets 100, such as tractor-trailer combinations. As noted, each powered asset 100 may be assigned a powered asset ID. Thus, when a container 107 or item 103 is transported to a location in the powered asset 100, the location of the container 107 and/or item 103 may be collected and stored as or in association with the item information/data. This information may be received as automated input—e.g., via beacons, barcodes, GPS, or as manual input from a user. Moreover, depending on the carrier, the location information/data may be detailed or general. For instance, an appropriate computing entity may receive information/data indicating the location of the container 107 and/or item 103. For example, the location information/data may indicate that the location of a container 107 and/or an item 103 in a powered asset 100—located five linear feet from the door on the left side of the trailer. This location information/data can be stored as or in association with the item information/data as tracking information/data and used to indicate the location of the container 107 or item within the powered asset 100 (e.g., tractor/trailer). In one embodiment, the locations of the containers 107 and/or items 103 can be used to create or stored in a manner that allows for generation of a 2D or 3D model of containers 107 and/or items 103 in the powered asset 100.

In one embodiment, this type of tracking and association may be fully automated using beacons/tags/sensors. For instance, a powered asset beacon 150 may associate a container 107 and/or an item 103 with a particular location and/or powered asset 100 (and/or location in a powered asset 100) using the corresponding information/data (e.g., unique container identifier) transmitted by the container/item 155. For instance, to do so, the powered asset beacon 150 (or other computing entity) may transmit a tracking event signal/communication to an appropriate computing entity to initiate the process of associating the container 107 and/or item 103 with the powered asset 100 and/or location. In one embodiment, an appropriate computing entity may associate the container 107 and/or item 103 with the location and/or powered asset 100 (and/or location in the powered asset 100) upon receiving the tracking signals/communications from the powered asset beacon 150. The location of the powered asset 100 (and therefore the location of the associated container 107 and or items 103) can be updated continuously, regularly, periodically, upon determining the occurrence of one or more configurable triggers/events, and/or the like. Using this approach, an appropriate computing entity may generate and transmit signals/communications to the carrier system 110 to initiate the process of updating the location of the container 107 and/or item 103 as being the location of the corresponding powered asset 100. Similarly, the location information/data of the powered asset 100 (and thereby the container 107 and/or items 103) may be identified/determined using GPS technologies by acquiring, for example, latitude, longitude, altitude, and/or geocode data corresponding to workers/users. Additionally or alternatively, the location information/data may be collected and provided via triangulation of various communication points (e.g., cellular towers, Wi-Fi access points, etc.) positioned at locations throughout a geographic area. Such embodiments allow the location and/or movement of powered assets 100 and associated containers 107 and/or items to be monitored and tracked. As will be recognized, a variety of other approaches and techniques can be used to adapt to various needs and circumstances. The location of each can be updated and stored in a tracking database, for example, by the carrier system 110. The location of the powered assets 100 and containers 107 and/or items 103 can be monitored, tracked, and updated continuously, regularly, periodically, upon determining the occurrence of one or more configurable triggers/events, and/or the like. For example, the item information/data for the item 103 can be updated to reflect the latest or most-recent tracking events (e.g., tracking information/data) for the container 107, item 103, powered asset 100, facility, and/or the like. That is, all of this information/data may be stored as or in association with the item information/data. As will be recognized, a variety of other approaches and techniques can be used to adapt to various needs and circumstances.

In the context of a final leg/segment for delivery, the carrier system 110 can create/generate dispatch plans for carrying out the pick-up and/or delivery of items (e.g., work or units of work) to one or more serviceable points. Dispatch plans are well known and are used daily by various carriers and can be associated with specific powered assets 100, carrier personnel, facilities, and/or the like. In general, dispatch plans are groups of routes planned to be dispatched together along with their associated delivery and pick-up assignments. Dispatch plans may also indicate how each route should be loaded. A route is generally a grouping of address ranges for serviceable points with associated service levels assigned to a single service provider (e.g., carrier delivery personnel). Each route usually includes a trace, which is a predefined path through a deliverable territory within a loop defined by a sequence number. A delivery order listing then is a listing of address ranges for serviceable points that follows the trace for the route to visit to perform the assigned pick-ups and/or deliveries for serviceable points. Through an appropriate interface, dispatch plans can be compared against alternative dispatch plans to load balance and otherwise adjust the various dispatch plans for a given geographic area, service center, route, and/or the like. U.S. Pat. No. 7,624,024 entitled Systems and Methods for Dynamically Updating a Dispatch Plan, filed Apr. 18, 2005, provides a general description of dispatch plans and how these plans may be generated and updated. This may include dynamically updating dispatch plans to add, remove, or update pick-ups and/or deliveries for serviceable points. U.S. Pat. No. 7,624,024 is incorporated herein in its entirety by reference.

Figure 1B:
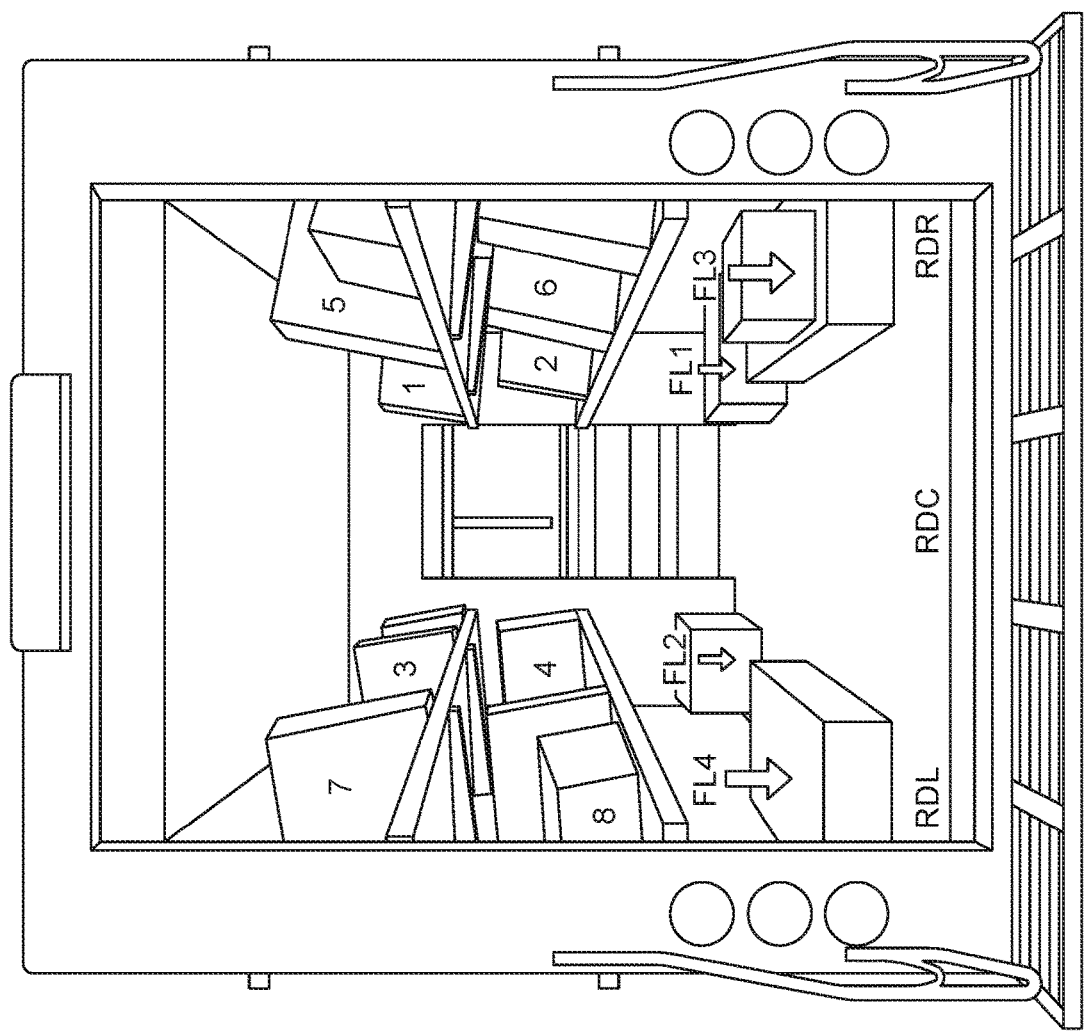
Figure 1C:
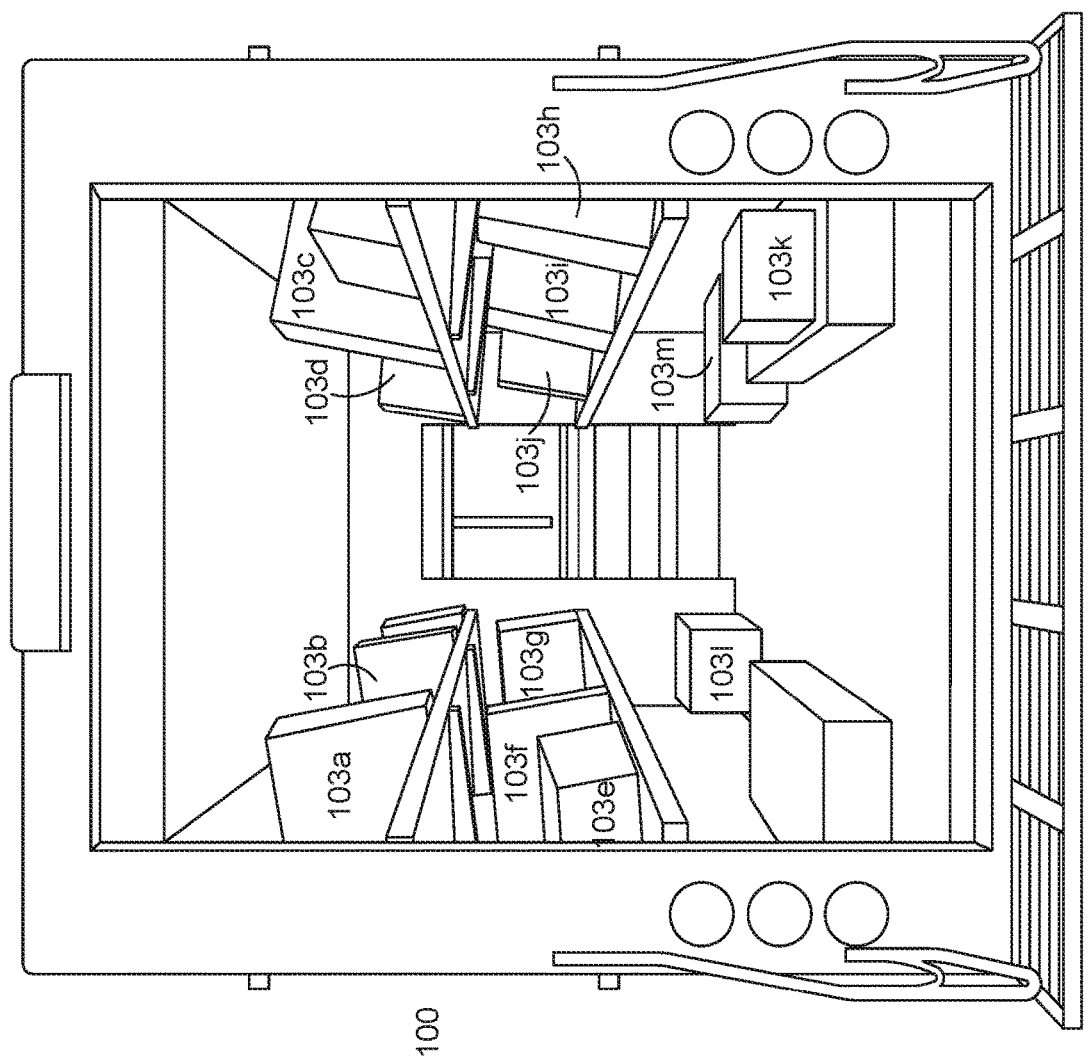

Continuing with the above, so that the items can be readily accessed in the powered asset 100 (e.g., last mile delivery vehicle) based on the delivery order listing, each item 103 can be assigned a load/storage position in the powered asset 100 (e.g., delivery vehicle). FIG. 1B identifies 15 exemplary load/storage positions: 1, 2, 3, 4, 5, 6, 7, 8, FL1 (floor 1), FL2 (floor 2), FL3 (floor 3), FL4 (floor 4), RDL (rear door left), RDC (rear door center), and RDR (rear door right). In one embodiment, each load/storage position may be associated with a sequence number. For instance, each item 103 may be assigned a sequence number between X001-X999 (a number within the sequence range) based upon the load/storage position. For example, for an item 103 assigned to load/storage position 1, the item 103 may also be assigned a sequence number between 1001-1999 to indicate where on the load/storage position the item 103 should be placed (e.g., 1538). Such items 103 are represented in FIG. 1C as items 103a-103i. In an embodiment in which 1500 indicates the midpoint of the shelf (e.g., load/storage position), sequence numbers 1001-1499 may indicate where on the shelf the item 103 should be placed in relation to the midpoint (how far to the left). Similarly, sequence numbers 1501-1999 may also indicate where on the shelf (e.g., load/storage position) the item 103 should be placed in relation to the midpoint (how far to the right). The same can occur for each load/storage position by assigning a sequence range and/or a sequence number to each item 103 that is associated with the corresponding load/storage position: 1001-1999, 2001-2999, 3001-3999, 4001-4999, 5001-5999, 6001-6999, 7001-7999, 8001-8999, FL1001-FL1999, FL2001-FL2999, FL3001-FL3999, FL4001-FL4999, RDL001-RDL999, RDC001-RDC999, and RDR001-RDR999. When an item 103 is loaded onto a powered asset 100 (e.g., delivery vehicle), the location or position of item 103 may be stored as or in association with the item information/data. This location information/data may be received as automated input, e.g., via beacons, barcodes, GPS, or as manual input from a user. Moreover, the location information/data may be detailed or general. For instance, an appropriate computing entity may receive information/data indicating the location of the container 107 and/or item 103. For example, the location information/data may indicate the location of the container 107 and/or item 103 as being five linear feet from the door on the left side of the trailer. This location information/data can be stored as or in association with the item information/data as tracking information/data and used to indicate the location of the container 107 or item 103 within the powered asset 100. With the location information/data of the container 107 and/or item 103 associated with the powered asset 100 (or facility), the location of the powered asset 100 (or facility) can be readily determined with regard to the powered asset 100 (or facility). As will be recognized, a variety of other approaches and techniques can be used to adapt to various needs and circumstances (operations/steps 530, 535, and 540 of FIG. 5B).

3. Beacon/Tag/Sensor-Based Augmented Reality

In one embodiment, to overcome the technical challenge of providing an augmented/mixed reality environment that displays an actual image of an item of interest or a proportionally dimensioned representation of the item of interest, a beacon/tag/sensor-based approach can be used. FIGS. 9A and 9B provide exemplary operations/steps for carrying out such an approach.

In one embodiment, as indicated in operation/step 900 of FIG. 9A, a container/item beacon 155 can continuously, regularly, or periodically broadcast signals/communications that include its corresponding tracking identifier. For instance, the container/item beacon 155 may be in advertising/broadcast mode and may continuously transmit signals/communications that include its tracking identifier. In another embodiment, the container/item beacon 155 may be in listening mode and transmit signals/communications in response to one or more requests or triggers. As will be recognized, the signals/communications may include various information, such as tracking identifiers, beacon/tag/sensor identifiers, location information/data, RSSI information/data, and/or the like. As an alternative, and similar to a container/item beacon 155, a powered asset beacon 150 can continuously, regularly, or periodically broadcast signals/communications that include its corresponding powered asset identifier. Similar to the container/item beacon 155, these signals/communications may include various information, such as tracking identifiers, beacon/tag/sensor identifiers, powered asset identifiers, location information/data, RSSI information/data, and/or the like.

In operation/step 905, a user computing entity 105 can receive the broadcast or transmitted signal/communication originating from the container/item beacon 155 (operation/step 905 of FIG. 9A). In one embodiment, the user computing may be operated by carrier personnel in a variety of settings. After receiving the transmitted signal/communication, the user computing entity 105 can extract or obtain the tracking identifier from the signal/communication by processing the signal/communication. In another embodiment, the user computing entity 105 can extract or obtain the container/item beacon identifier or the powered asset beacon identifier from the signal/communication by processing the signal/communication. Using the tracking identifier (or alternatively a beacon identifier) from the signal/communication, the user computing entity 105 can request item information/data for the item 103. FIG. 10 comprises a portion of an exemplary request that can be transmitted from a user computing entity 105 (or any other entity) to an application programming interface (API) of the carrier system 110. In this example, the request is for item information/data and identifies the tracking number for the item of interest (operation/step 910 of FIG. 9A). As will be recognized, the request could also include a beacon identifier or various other identifiers.

In operation/step 915, the request for item information/data can be received by the API of the carrier system 110. And in response, using the tracking identifier (or alternatively the beacon identifier), the carrier system 110 can retrieve at least a portion of the item information/data by, for example, querying or communicating with one or more databases storing item information/data (operation/step 920 of FIG. 9A). The carrier system 110 can then receive the item information/data from the one or more databases. In one embodiment, the received item information/data can include the location where the images of the item of interest are stored (e.g., stock-size-four.images.carrier.com or 1Z5600100300083767.images.carrier.com). In another embodiment, the received item information/data can include one or more images (which may be resized for efficiencies) that were captured of the item of interest at some point during the transportation process.

In operations/steps 925 and 930, the carrier system 110 can process the item information/data by formatting and filtering the item information/data and provide a response to the user computing entity 105 with the corresponding item information/data. An exemplary response to the API request is provided in FIG. 11. In this example, the response includes the location where the images for the item of interest are stored: 1Z5600100300083767.images.carrier.com. The user computing entity 105 can receive the response from the carrier system 110 and retrieve the images from the specified location (operations/steps 935 and 940). For example, the user computing entity 105 may request the images for the item 103 via another API call to a system or database. In response, the user computing 105 can receive the corresponding images.

In an alternative embodiment, images for all containers 107 and items 103 can be requested and received based on a dispatch plan associated with a powered asset 100. Thus, for example, when a user is interacting with containers 107 and/or items 103 on a powered asset 100, all of the images for the containers 107 and/or items 103 on the powered asset 100 can be requested by the user computing entity 105 to increase efficiency, reduce image presentation latency, and reduce bandwidth by limiting the number of requests generated and responses received. In yet another embodiment, the user computing entity 105 can be preloaded (e.g., for offline or out or range use) with the images for multiple dispatch plans and/or powered asset 100 to achieve the same or similar benefits.

With the images received for the item of interest, the user computing entity 105 can generate an augmented/mixed reality environment for display and display the same via the user computing entity 105 (operation/step 945). The operations/steps for generating and displaying an augmented/mixed reality environment are described in greater detail in FIG. 9B. As will be recognized, the described operations/steps are exemplary and a variety of other operations/steps can be performed to adapt to various needs and circumstances.

To begin, the user computing entity 105 can determine the location of the item of interest (operation/step 945A). In one embodiment, the user computing entity 105 can determine an approximate distance between the container/item beacon 155 and the user computing entity 105. In this embodiment, the user computing entity 105 can determine the location of the container/item beacon 155 based on the RSSI of the signal/communication broadcast or transmitted from the container/item beacon 155. For example, the user computing entity 105 can estimate the distance between the container/item beacon 155 and the user computing entity 105 and estimate the location of the container/item beacon 155 using any of a variety of location algorithms—including trilateral location, triangulation location, maximum likelihood location, centroid location, convex programming location, and DV-Hop location. In another embodiment, the powered asset beacon 150 (or other entity) can continuously, regularly, periodically, or upon determining the occurrence of one or more configurable triggers/events provide its location information/data (e.g., GPS coordinates) for receipt by container/item beacons 155 within range. For instance, a powered asset beacon 150 (or other entity) can broadcast GPS coordinates every 5 seconds for container/item beacons 155 within range. The container/item beacons 155 within range can receive and store the GPS coordinates as being their location. In this embodiment, each container/item beacon 155 can include its location information/data (e.g., GPS coordinates) in the signal/communication broadcast or transmitted to the user computing entity 105 (e.g., operation/step 900). In yet another embodiment, the user computing entity 105 may also be in communication with any of the computing entities associated with the powered asset 100, each of which can provide location information/data for the powered asset 100 and thereby location information/data for the associated containers 107 and/or items 103.

With the location information/data for an item of interest, the user computing entity 105 can determine its location and POV/FOV (operation/step 945B). For example, the user computing entity 105 can determine its location and orientation/bearing (e.g., x, y, and z axes) corresponding to the real world environment/area (e.g., coordinate system). The user computing entity 105 can then register the location of the item 103 based on the item's location information/data in the real world environment/area (e.g., coordinate system). In this example, the user computing entity 105 can use the location information/data for the item 103 until the user computing entity 105 receives updated location information/data.

With the location of the item 103, the location of the user computing entity 105, and the POV/FOV of the user computing entity 105, the user computing entity 105 (e.g., via a rendering engine) can generate an augmented/mixed reality environment layer to be superimposed over at the least a portion of the real world environment in the POV/FOV of the user computing entity 105 (e.g., operation/step 945C). The augmented/mixed reality environment layer can include the actual or stock image of the item of interest. After generating the augmented/mixed reality environment layer, the user computing entity 105 can superimpose or overlay the augmented/mixed reality environment layer over at the least a portion of the real world environment in the POV/FOV of the user computing entity 105 as visible through its display. The operations/steps 945A, 945B, 945C, and 945D can be repeated continuously, regularly, periodically, or upon determining the occurrence of one or more configurable triggers/events to update the augmented/mixed reality environment layer and the corresponding display. As will be recognized, a variety of other approaches and techniques can be used to adapt to various needs and circumstances.

4. Marker-Based Augmented Reality

In one embodiment, to overcome the technical challenge of providing an augmented/mixed reality environment that displays an actual image of an item of interest or a proportionally dimensioned representation of the item of interest, a marker-based approach can be used. FIGS. 12A and 12B provide exemplary operations/steps for carrying out such an approach.

In one embodiment, the user computing entity 105 may detect a marker 123 and/or target objects within its POV/FOV of the real world environment/area. For example, a reader scanner, camera, and/or the like may capture one or more visual codes (e.g., text, barcodes, character strings, Aztec Codes, MaxiCodes, information/data Matrices, QR Codes, electronic representations, and/or the like) from, for example, a powered asset 100 (operation/step 1205). As shown in FIG. 1, such a marker 123 may be any of a variety of machine readable codes and/or the like. The marker 123 may correspond to or have embedded therein the corresponding powered asset's identifier.

Responsive to acquiring a marker of a powered asset 100, for example, the user computing entity 105 can retrieve or request and receive a dispatch plan associated with the marker 123 (operations/steps 1210, 1215, and 1220) using the powered asset identifier. As will be recognized, the dispatch plan can be stored locally on the user computing entity 105 or remotely on the carrier system 110. The dispatch plan may include a listing of containers 107 and/or items 103 associated with the powered asset 100. Responsive to receiving the dispatch plan or at least a portion thereof, the user computing entity 105 can provide for display of a listing of containers 107 and/or items 103 associated with the powered asset 100. For each container 107 and/or item displayed via the listing, the listing may comprise a specific container indicator or item indicator. Such indicators may be all or portions of consignee/consignor names, all or portions of addresses, all or portions of tracking identifiers, and/or the like. The listing (and indicators) may be filterable, searchable, navigable, and/or the like and provide various information/data associated with the corresponding containers 107 and/or items 103. Similarly, individual containers 107 and/or items 103 may be selectable via an interface of the user computing entity 105. Responsive to a user navigating to and selecting an item of interest (operation/step 1225), the user computing entity 105 can request item information/data for the selected item 103 (operation/step 1230). FIG. 10 comprises a portion of an exemplary request that can be transmitted from a user computing entity 105 (or any other entity) to an API of the carrier system 110. In this example, the request is for item information/data and identifies the tracking number for the selected item of interest.

In operation/step 1235, the request for item information/data can be received by the API of the carrier system 110. And in response, using the tracking identifier, the carrier system 110 can retrieve at least a portion of the item information/data by, for example, querying or communicating with one or more databases storing item information/data (operation/step 1240 of FIG. 12A). The carrier system 110 can then receive the item information/data from the one or more databases. In one embodiment, the received item information/data can include the location where the images of the item of interest are stored (e.g., stock-size-four.images.carrier.com or 1Z5600100300083767.images.carrier.com). In another embodiment, the received item information/data can include one or more images (which may be resized for efficiencies) that were captured of the item of interest at some point during the transportation process.

In operations/steps 1245, the carrier system 110 can process the item information/data by formatting and filtering the item information/data and provide a response to the user computing entity 105 with the corresponding item information/data. An exemplary response to the API request is provided in FIG. 11. In this example, the response includes the location where the images for the item of interest are stored: 1Z5600100300083767.images.carrier.com. The user computing entity 105 can receive the response from the carrier system 110 and retrieve the images from the specified location (operations/steps 1250, 1255, and 1260). For example, the user computing entity 105 may request the images for the item 103 via another API call to a system or database. In response, the user computing 105 can receive the corresponding images.

In an alternative embodiment, images for all containers 107 and items 103 can be requested and received based on a dispatch plan associated with a powered asset 100. Thus, for example, when a user is interacting with containers 107 and/or items 103 on a powered asset 100, all of the images for the containers 107 and/or items 103 on the powered asset 100 can be requested by the user computing entity 105 to increase efficiency, reduce image presentation latency, and reduce bandwidth by limiting the number of requests generated and responses received. In yet another embodiment, the user computing entity 105 can be preloaded (e.g., for offline or out or range use) with the images for multiple dispatch plans and/or powered asset 100 to achieve the same or similar benefits.

With the images received for the item of interest, the user computing entity can generate an augmented/mixed reality environment for display and display the same via the user computing entity (operation/step 1265). The operations/steps for generating and displaying an augmented/mixed reality environment are described in greater detail in FIG. 12B. As will be recognized, the described operations/steps are exemplary and a variety of other operations/steps can be performed to adapt to various needs and circumstances.

To begin, the user computing entity 105 can determine the location of the marker 123 and/or item of interest (operation/step 1265A). In one embodiment, the user computing entity 105 can determine an approximate distance between the powered asset 100 and the user computing entity 105. In this embodiment, the user computing entity 105 can determine the location of the powered asset 100 based on the size and location of the marker in the POV/FOV of the user computing entity 105. In another embodiment, the powered asset 100 (or other entity) can continuously, regularly, periodically, or upon determining the occurrence of one or more configurable triggers/events provide its location information/data (e.g., GPS coordinates) for receipt by user computing entities 105 within range. For instance, a powered asset 100 (or other entity) can broadcast GPS coordinates every 5 seconds for user computing entities 105 within range. The user computing entities 105 within range can receive and store the GPS coordinates of the corresponding powered asset 100. Using either approach, the user computing entity can track the location of the asset and thereby the location of the item of interest with regard to the user computing entity's POV/FOV.

With the location information/data for an item of interest, the user computing entity 105 can determine its location and POV/FOV (operation/step 1265B). For example, the user computing entity 105 can determine its location and orientation/bearing (e.g., x, y, and z axes) corresponding to the real world environment/area (e.g., coordinate system). The user computing entity 105 can then register the location of the item 103 based on the item's location information/data in the real world environment/area (e.g., coordinate system). In this example, the user computing entity 105 can use the location information/data for the item 103 until the user computing entity 105 receives updated location information/data.

With the location of the item 103, the location of the user computing entity 105, and the POV/FOV of the user computing entity 105, the user computing entity 105 (e.g., via a rendering engine) can generate an augmented/mixed reality environment layer to be superimposed over at the least a portion of the real world environment in the POV/FOV of the user computing entity 105 (e.g., operation/step 1265C). The augmented/mixed reality environment layer can include the actual or stock image of the item of interest. After generating the augmented/mixed reality environment layer, the user computing entity 105 can superimpose or overlay the augmented/mixed reality environment layer over at the least a portion of the real world environment in the POV/FOV of the user computing entity 105 as visible through its display. The operations/steps 1265A, 1265B, 1265C, and 1265D can be repeated continuously, regularly, periodically, or upon determining the occurrence of one or more configurable triggers/events to update the augmented/mixed reality environment layer and the corresponding display. As will be recognized, a variety of other approaches and techniques can be used to adapt to various needs and circumstances.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing an augmented reality display comprising an image of an item of interest located in a powered asset, the method comprising:
   at a powered asset beacon attached to the powered asset:
      determining locations of items within the powered asset, and
      broadcasting the locations of the items to item beacons attached to the items within the powered asset, wherein each item beacon stores the location of its attached item;
   receiving, via a user computing entity comprising one or more processors and a display, a communication transmitted from an item beacon attached to the item of interest located within the powered asset, wherein the communication from the item beacon comprises the location of the item of interest broadcast from the powered asset beacon;
   identifying, via the user computing entity, a tracking identifier for the item of interest from the communication transmitted from the item beacon;
   generating, via the user computing entity, a request for item information for the item of interest, the request for the item information comprising the tracking identifier for the item of interest;
   receiving, via the user computing entity, a response with the item information for the item of interest, the response comprising a uniform resource identifier for an image of the item of interest;
   determining the location of the item of interest within the powered asset from the communication transmitted from the item beacon;
   retrieving, via the user computing entity, the image of the item of interest using the uniform resource identifier; and
   generating, via the user computing entity, an augmented reality display comprising a view of an interior of the powered asset and the image of the item of interest, wherein the image of the item of interest is depicted within the augmented reality display overlaying the location of the item of interest within the powered asset.

2. The method of claim 1, wherein the beacon is selected from the group consisting of a Bluetooth low energy beacon, a radio frequency identification tag, a near field communication device, a Wi-Fi device, a URIBeacon, an AltBeacon, and an iBeacon.

3. The method of claim 1, wherein the image is an actual image of the item of interest.

4. The method of claim 1, wherein the image is a stock image based on the dimensions of the item of interest.

5. The method of claim 1, wherein the communication transmitted from the beacon is transmitted by the beacon in a broadcasting mode.

6. The method of claim 1, wherein the communication transmitted from the beacon is transmitted in response to the occurrence of one or more triggers.

7. An apparatus comprising a display, a camera, at least one processor, and at least one memory including program code, the at least one memory and the program code configured to, with the processor, cause the apparatus to at least:
   via the camera, capture an image of an environment of a user operating the apparatus;
   receive a communication transmitted from a beacon attached to an item located within the environment of the user;

identify a tracking identifier for the item from the communication transmitted from the beacon;

generate a request for item information for the item, the request for the item information comprising the tracking identifier for the item;

receive a response with the item information for the item, the response comprising a uniform resource identifier for an image of the item that was captured during a transportation process of the item;

determine a location of the item within the environment of the user;

retrieve the image of the item using the uniform resource identifier; and generate an augmented reality display comprising the image of the environment of the user and the image of the item, wherein the image of the item is depicted within the augmented reality display overlaying a location corresponding to the location of the item within the environment of the user.

8. The apparatus of claim 7, wherein the beacon is selected from the group consisting of a Bluetooth low energy beacon, a radio frequency identification tag, a near field communication device, a Wi-Fi device, a URIBeacon, an AltBeacon, and an iBeacon.

9. The apparatus of claim 7, wherein the image is an actual image of the item.

10. The apparatus of claim 7, wherein the image is a stock image based on the dimensions of the item.

11. The apparatus of claim 7, wherein the communication transmitted from the beacon is transmitted by the beacon in a broadcasting mode.

12. The apparatus of claim 7, wherein the communication transmitted from the beacon is transmitted in response to the occurrence of one or more triggers.

13. A computer program product for providing an augmented reality display comprising an image of an item, the computer program product comprising at least one non-transitory computer-readable storage medium having computer-readable program code portions stored therein, the computer-readable program code portions comprising:

an executable portion configured to display a list of items associated with a powered asset;

an executable portion configured to receive a user selection of an item of interest from the list of items;

an executable portion configured to receive a communication transmitted from a beacon attached to the item of interest;

an executable portion configured to identify a tracking identifier for the item of interest from the communication transmitted from the beacon;

an executable portion configured to, in response to the user selection of the item of interest, generate a request for item information for the item of interest, the request for the item information comprising the tracking identifier for the item of interest;

an executable portion configured to receive a response with the item information for the item of interest, the response comprising a uniform resource identifier for an image of the item of interest;

an executable portion configured to determine a location of the item of interest;

an executable portion configured to retrieve the image of the item of interest using the uniform resource identifier; and an executable portion configured to generate an augmented reality display comprising the image of the item of interest, wherein the image of the item of interest is depicted within the augmented reality display overlaying a location corresponding to the location of the item of interest.

14. The computer program product of claim 13, wherein the beacon is selected from the group consisting of a Bluetooth low energy beacon, a radio frequency identification tag, a near field communication device, a Wi-Fi device, a URIBeacon, an AltBeacon, and an iBeacon.

15. The computer program product of claim 13, wherein the image is an actual image of the item of interest.

16. The computer program product of claim 13, wherein the image is a stock image based on the dimensions of the item of interest.

17. The computer program product of claim 13, wherein the communication transmitted from the beacon is transmitted by the beacon in a broadcasting mode.

18. The computer program product of claim 13, wherein the communication transmitted from the beacon is transmitted in response to the occurrence of one or more triggers.

* * * * *

UNITED STATES PATENT AND TRADEMARK OFFICE
CERTIFICATE OF CORRECTION

PATENT NO. : 10,783,682 B2
APPLICATION NO. : 15/798664
DATED : September 22, 2020
INVENTOR(S) : Andrew Dotterweich et al.

Page 1 of 1

It is certified that error appears in the above-identified patent and that said Letters Patent is hereby corrected as shown below:

In the Drawings

In sheet 7 of 17, FIG. 5A., reference numeral 525, Line 1, delete "DATAWITH" and insert -- DATA WITH --, therefor.

In sheet 16 of 17, FIG. 12A., reference numeral 1245, Line 1, delete "PROVIDE ITEM PROVIDE ITEM" and insert -- PROVIDE ITEM --, therefor.

In the Specification

In Column 5, Line 63, delete "and or" and insert -- and/or --, therefor.

In Column 20, Line 54, delete "and or" and insert -- and/or --, therefor.

Signed and Sealed this
Seventeenth Day of November, 2020

Andrei Iancu
*Director of the United States Patent and Trademark Office*